Feb. 22, 1944. R. E. KING ET AL Re. 22,440

TELEPHONE SYSTEM

Original Filed Dec. 1, 1938 9 Sheets-Sheet 1

INVENTORS: R. E. KING
O. R. MILLER
BY W. T. McKenney
ATTORNEY

Feb. 22, 1944. R. E. KING ET AL Re. 22,440

TELEPHONE SYSTEM

Original Filed Dec. 1, 1938 9 Sheets-Sheet 2

INVENTORS: R.E. KING
O.R. MILLER
BY
W. M. McKinney
ATTORNEY

TELEPHONE SYSTEM

Original Filed Dec. 1, 1938 9 Sheets-Sheet 3

INVENTORS: R. E. KING
O. R. MILLER
BY
W. P. McKenney
ATTORNEY

TELEPHONE SYSTEM

Original Filed Dec. 1, 1938 9 Sheets-Sheet 4

INVENTORS: R. E. KING
O. R. MILLER
BY
M. T. McFerney
ATTORNEY

TELEPHONE SYSTEM

Original Filed Dec. 1, 1938 9 Sheets-Sheet 5

INVENTORS: R. E. KING
O. R. MILLER
BY
W. T. McKenney
ATTORNEY

TELEPHONE SYSTEM

Original Filed Dec. 1, 1938 9 Sheets-Sheet 6

INVENTORS: R. E. KING
O. R. MILLER
BY
W. T. McKenney
ATTORNEY

Feb. 22, 1944. R. E. KING ET AL Re. 22,440

TELEPHONE SYSTEM

Original Filed Dec. 1, 1938 9 Sheets-Sheet 7

INVENTORS: R. E. KING
O. R. MILLER
BY
W. T. McKenney
ATTORNEY

Feb. 22, 1944. R. E. KING ET AL Re. 22,440

TELEPHONE SYSTEM

Original Filed Dec. 1, 1938 9 Sheets-Sheet 8

INVENTORS: R.E. KING
O.R. MILLER
BY
M.T. McKenney
ATTORNEY

Feb. 22, 1944. R. E. KING ET AL Re. 22,440

TELEPHONE SYSTEM

Original Filed Dec. 1, 1938 9 Sheets-Sheet 9

INVENTORS: R.E. KING
O.R. MILLER
BY
W.T. McKenney
ATTORNEY

Reissued Feb. 22, 1944

Re. 22,440

UNITED STATES PATENT OFFICE 22,440

TELEPHONE SYSTEM

Ralph E. King, Short Hills, and Ohmer R. Miller, Morristown, N. J., assignors to Bell Telephone Laboratories, Incorporated, New York, N. Y., a corporation of New York Oiginal No. 2,208,765, dated July 23, 1940, Serial No. 243,347, December 1, 1938. Application for reissue July 17 ,1942, Serial No. 451,362

42 Claims. (Cl. 179—27)

This invention relates to telephone systems and particularly to systems comprising toll offices and automatic switching means for completing toll calls.

It is the object of the invention to minimize the number of manual switching operations involved in establishing toll connections, to expedite the completion of such connections, and to more efficiently and reliably effect the transmission of directive and supervisory signals to and through the automatic switching means employed in completing desired connections.

This invention is a telephone system comprising toll offices in which automatic switches are provided for routing incoming calls to called toll and local offices, the talking conductors of one or more of the trunk and selector circuits constituting a simplex circuit, the balanced or unbalanced condition of which is effective to control one or more differential, signaling relays and the resistance of which is effective to control one or more marginal signaling relays. According to a feature of the invention, a differential signaling relay having one winding connected in series with one conductor of a simplex signaling circuit and the other winding connected in series with the other winding of the simplex circuit is operatively responsive to an unbalance in the simplex circuit. According to another feature, each of two polarized differential signaling relays has one winding in series with one conductor of a simplex circuit and another winding in series with the other conductor of the simplex circuit, one of said relays being operatively responsive to an unbalance which causes a stronger current in one side of the simplex circuit and the other of said relays being operatively responsive to an unbalance which causes a stronger current in the other side of the simplex circuit.

Another feature of the invention is a toll system in which the talking conductors of a toll route selector comprise a simplex circuit for transmitting directive impulses from an associated incoming line to the selector, for transmitting directive or supervisory signals to a succeeding selector or trunk used in completing a desired connection, for controlling the transmission efficiency of the associated incoming line, and for controlling the release of the selector.

A further feature of the invention is an arrangement whereby the operator's dial, which is automatically disconnected from an outgoing intertoll trunk upon completion of dialing, may be reassociated with the trunk merely by reoperation of a common dial key without disconnecting the cord from and reconnecting the cord to the outgoing trunk circuit.

Another feature of the invention is a toll system in which an incoming line may be connected with any one of a plurality of trunks through switching means comprising talking conductors and a signaling conductor, circuits being closed through the signaling conductor for controlling the transmission pads associated with the incoming line while the connection between the incoming line and a desired trunk is being established, and for transmitting supervisory signals from the connected trunk line to the incoming line. According to this feature the winding of a marginal relay is connected in circuit with the winding of a normally operated relay and the signaling conductor, the normally operated relay being held operated while the connection of the incoming line with a desired trunk is being established, the marginal relay being actuated upon connection of the incoming line with the trunk to shift the control of the transmission pads from the circuit through the signaling conductor to a circuit including the talking conductors in parallel, the answering of the call by an operator or subscriber being effective to open the pad control circuit over the signaling conductor to cause the release of the normally operated relay and thereby connect the signaling conductor to an answering supervisory relay associated with the incoming line.

The invention will be further explained by describing the telephone system illustrated in the drawings which form a part of this specification and in which system the invention is embodied. The invention is, of course, not limited in its application to the particular system shown in the drawings.

Referring to the drawings:

Fig. 5 also shows another two-way trunk circuit TWT4, an outgoing trunk circuit OT4 and composite signaling circuit CS4, all associated with an intertoll trunk T4;

Fig. 7 also shows another toll route selector TS3;

Figure 7:
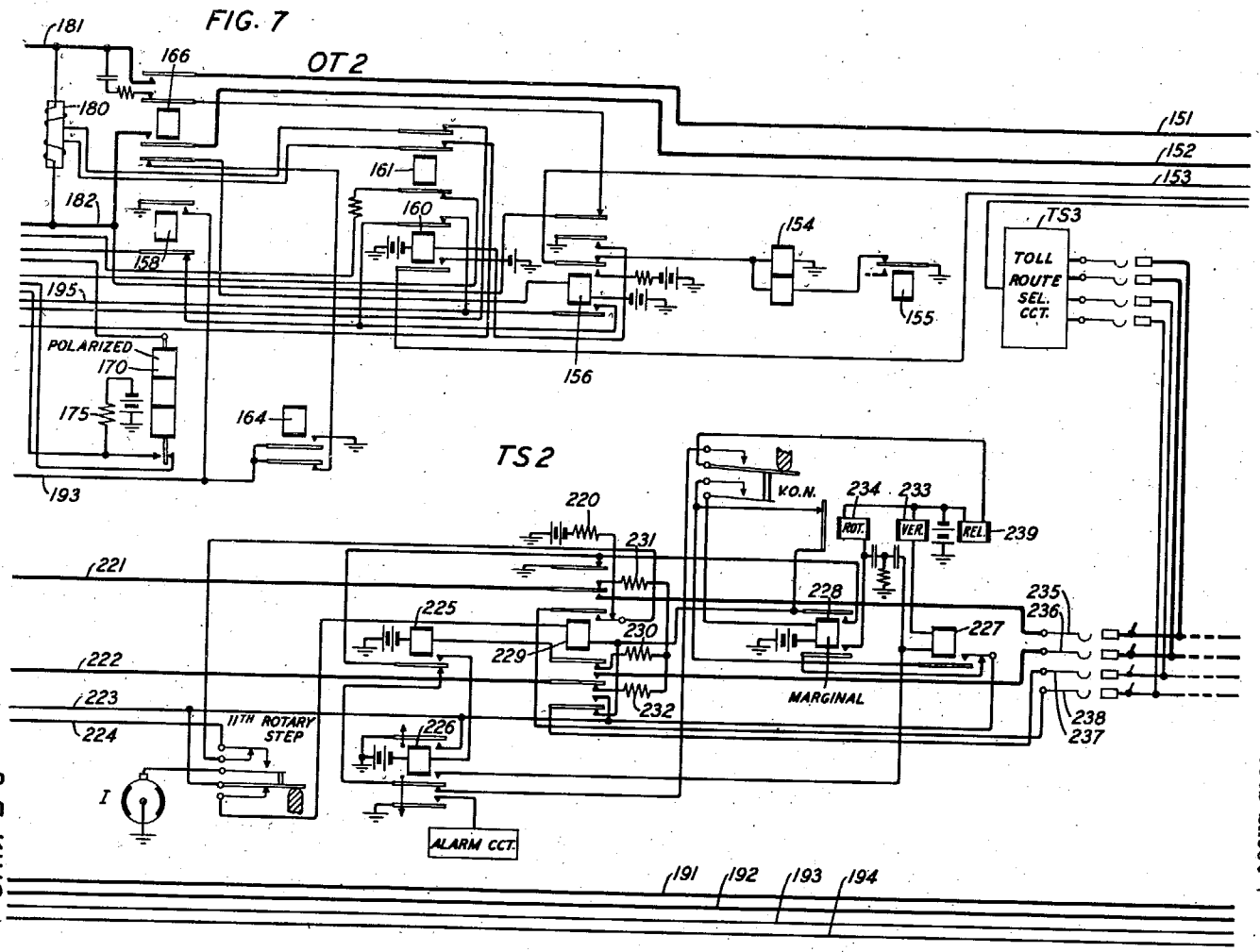
Fig. 7 shows a toll route selector TS2 and an outgoing trunk circuit OT2 both associated with the two-way trunk circuit TWT2 of Fig. 6.
Figure 8:
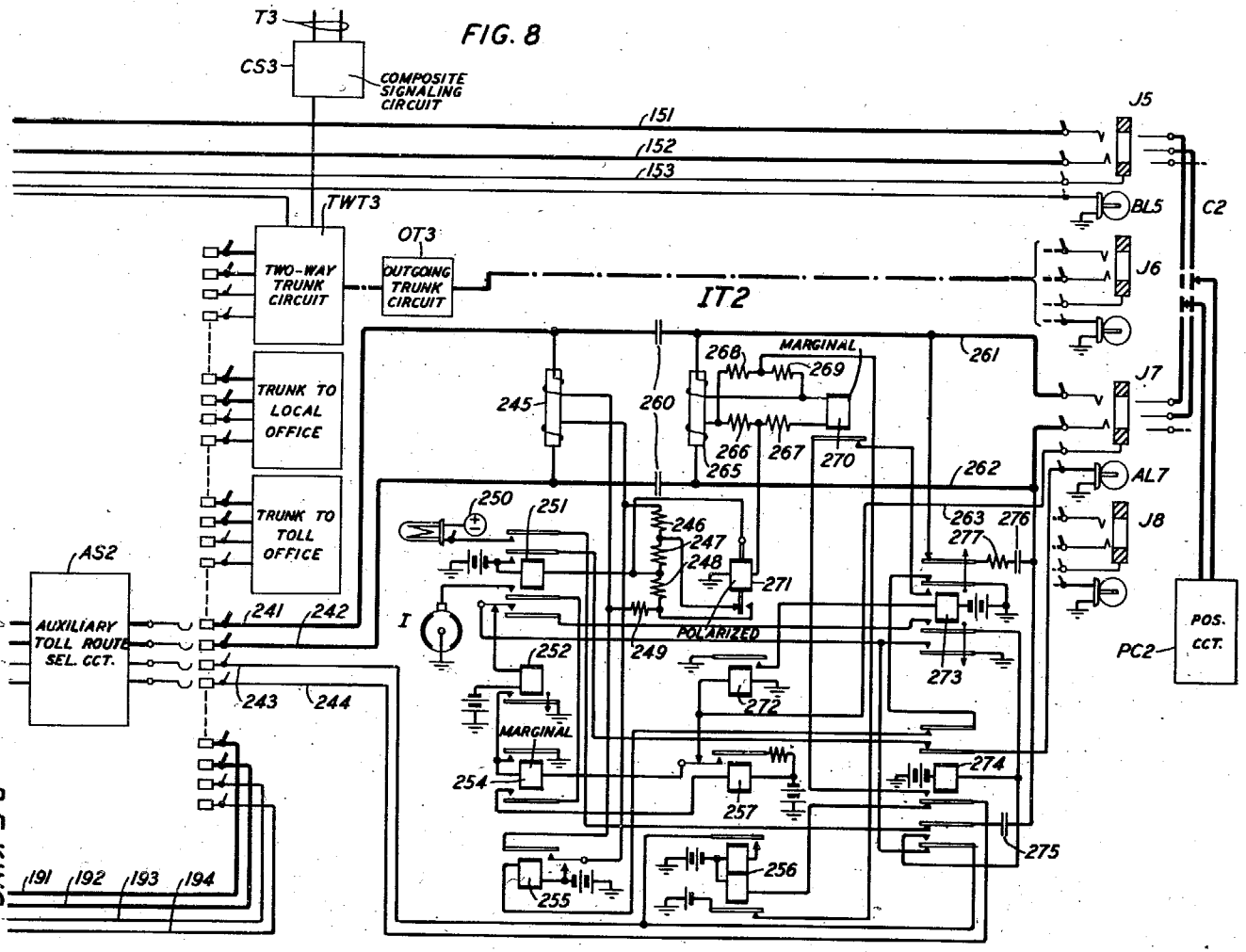
Figure 9:
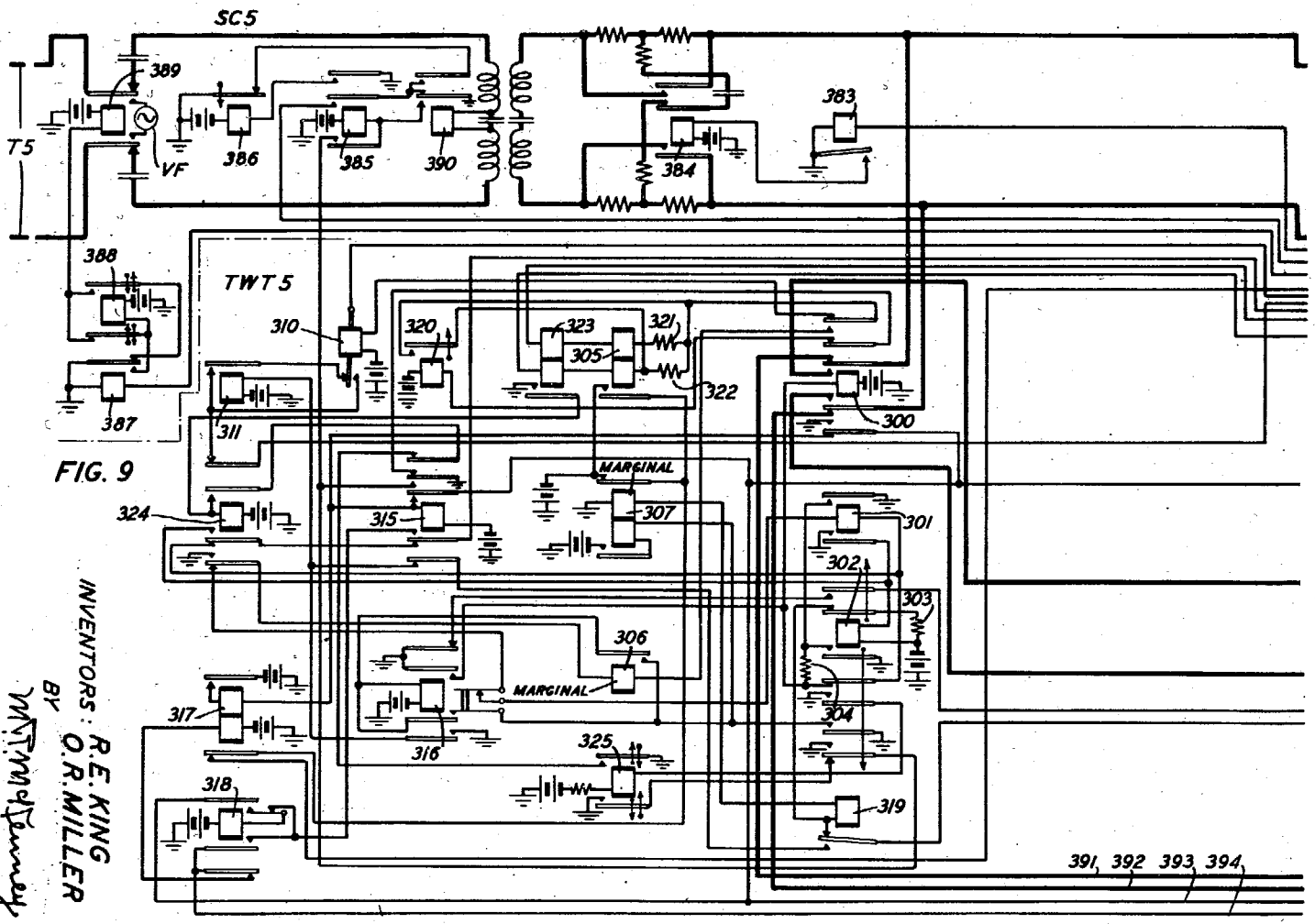

Fig. 8 shows an operator's cord C2 and position circuit PC2, outgoing jacks J5 and J6, answering jacks J7 and J8, an auxiliary toll route selector AS2, and an incoming trunk circuit IT2 connected to jack J7; Fig. 8 also shows an intertoll trunk T3, a composite signaling circuit CS3 and a two-way trunk circuit TWT3 connecting trunk T3 to the selector TS3 of Fig. 7 and an outgoing trunk circuit OT3 connecting this trunk to jack J6;

Fig. 9 shows a voice frequency signaling circuit SC5 and an associated two-way trunk circuit TWT5 connected to an intertoll trunk T5, the distant end of which is also arranged for voice frequency signaling; and Fig. 10 shows the relation of each of Figs. 1 to 8, inclusive, to form an operative arrangement.

The system represented in the drawings includes a plurality of toll offices, each of which comprises a toll board with operator's positions and cords for answering calls incoming from local manual or dial offices, from toll subscribers' lines, from community dial offices, or from other toll offices and for extending an incoming call to a switching trunk leading to a called local manual or dial office, to a called toll subscriber's line, to a community dial office, or to an intertoll trunk. Outgoing jacks such as J1, J2 in one office, and J5 and J6 in a second office, connect to switching trunks, toll lines, trunks to community dial offices, and intertoll trunks. Answering jacks such as J3, J4 in the one office, and J7 and J8 in the second office, are directly connected to recording trunks, toll subscribers' lines, trunks from community dial offices, and intertoll trunks. The terminals in the banks of incoming or auxiliary toll route selectors such as TS1, TS2, TS3, TS4, AS1 and AS2 are also connected to the various lines and trunks other than the recording trunks.

The operator's positions PC1 and PC2 are provided with dials and dialing circuits for controlling the operation of incoming and auxiliary toll route selectors in other toll offices and for controlling the operation of the usual toll train in local or community dial offices. The dial circuit DC1 and trunk circuit OT1 are arranged, as hereinafter described, so that the dial may be reconnected to the impulse receiving relay of the trunk circuit by the reoperation of the position dial key without having first disconnected the cord from the trunk circuit.

The intertoll trunk T1 is a two-way trunk between a first and a second office and is arranged for composite signaling. At one end, trunk T1 is connected to the composite, signaling circuit CS1, the two-way trunk circuit TWT1, the outgoing trunk circuit OT1, and the incoming toll route selector TS1; at the other end, trunk T1 is connected to the composite signaling circuit CS2, two-way trunk circuit TWT2, outgoing trunk circuit OT2, and the incoming toll route selector TS2. The two-way trunk circuits TWT1 and TWT2 also connect to terminals in the banks of auxiliary toll route selectors AS1 and AS2 so that trunk T1 may be seized either by connecting a cord C1 or C2 to outgoing jack J1 or J5 or by the operation of an incoming and an auxiliary toll route selector.

The composite signaling circuits CS1 and CS2, the two-way trunk circuits TWT1 and TWT2, the outgoing trunk circuit OT1, the incoming toll route selector TS2 and the incoming trunk circuit IT2 are shown in detail. The outgoing trunk circuit OT2 which is shown only in part is similar to the outgoing trunk circuit OT1, the incoming toll route selector TS1 is similar to the incoming toll route selector TS2; and the incoming trunk circuit IT1 is similar to the incoming trunk circuit IT2. The auxiliary toll route selectors AS1 and AS2 are similar to the toll route selector TS2.

The intertoll trunk T4 is one of a group between the first office and a third office which is not shown in the drawings; and the intertoll trunk T3 is one of a group between the second office and a fourth office, not shown in the drawings. The associated composite signaling circuits CS3 and CS4, two-way trunk circuits TWT3 and TWT4, outgoing trunk circuits OT3 and OT4, and incoming toll route selectors TS3 and TS4 are similar to the corresponding circuits and selectors associated with intertoll trunks T1.

The intertoll trunk T5, which is arranged for voice frequency signaling instead of composite signaling, is one of a group between the second office and a fifth office which is not shown in the drawings. The associated two-way trunk circuit TWT5 is a modification of the two-way trunk circuit TWT2 of Fig. 6 to function with the voice frequency signaling circuit SC5. The associated outgoing trunk circuit and incoming toll route selector are similar to the outgoing trunk circuit OT2 and incoming toll route selector TS2; and an operative arrangement is formed by placing Fig. 9 adjacent and to the left of Fig. 7 with Fig. 8 adjacent and to the right of Fig. 7. The reference characters applied to the relays of trunk circuit TWT5 which correspond to relays of trunk circuit TWT2 of Fig. 6 have like tens and units digits.

The toll route selectors TS1, TS2, TS3 and TS4 and auxiliary route selectors AS1 and AS2 are of the well-known two-motion step-by-step type. For a description of the structure of such switches reference may be had to pages 57 to 63 of the second edition of "Automatic Telephony" by Smith and Campbell. The switches TS1, TS3, TS4, AS1 and AS2 are each represented by a set of brushes and one or more sets of terminals but none of the magnets, relays or other apparatus associated with these switches is shown in the drawings. The bank of the toll route selector TS1 is represented by a single set of terminals but this selector is otherwise complete with all magnets, relays and other associated apparatus.

Assume now that a call incoming to the toll board in the first office is answered by connecting the plug RP of cord C1 to an answering jacks such as J3 or J4. The talking key TK having been operated, and the position circuit being idle, relay 10 is operated by the energization of its left winding. Relay 10 closes a circuit for operating relay 20 of the position circuit and relay 20 closes the locking circuit through the right winding of relay 10. The operator's telephone is connected through the contacts of relay 10 to the calling line or trunk. To extend the connection, the plug FP is connected to an outgoing jack such as J1 or J2; and, if the connected outgoing trunk is arranged for dialing, as is the case if completion of the call includes the selective operation of one or more toll route selectors or the selective operation of a toll train in a local or community dial office, the dial key DK is operated to its Front position. Although th cord and position circuits C1 and PC1 are arranged so that the dial D1 may be connected to either end of the cord, only the relays and connections necessary for dialing over the front plug FP are shown in the drawings. Assume further that on the call in question, plug FP is connected through jack J1 to the outgoing trunk circuit OT1. A circuit is closed through the sleeve conductor of plug FP and contacts of key TK for operating relays 21 and 22 of the position circuit and sleeve relay 54 of the outgoing trunk circuit. Relay 21 closes a circuit for operating relay 23 and relay 22 closes a circuit lighting the cord supervisory lamp FL. With the dial key DK operated and relay 23 operated, relay 24 of the dial circuit DC1 operates, disconnecting the tip and ring conductors of the plug FP from the operator's telephone set and closing a circuit for operating relay 25. Relay 25 closes a circuit for lighting the dial pilot lamp DP and a circuit which includes back contacts of relays 28, 35, 36, and 31 for operating relay 26. Relay 26 closes a circuit for operating relay 27. Relay 27 closes a circuit for operating relay 28. Relay 28 locks under control of relays 25, 35, 36 and 31 and opens the operating circuit of relay 26.

In the outgoing trunk circuit OT1, the operation of relay 54 closes a circuit for operating relay 68. Relay 68 locks under control of relay 69 and closes a circuit for operating relay 58. Relay 58 closes a circuit lighting the busy lamps such as BL1 associated with jack J1 and other jacks connected in multiple with jack J1; closes circuits for operating relays 64 and 69; closes a circuit including the inner lower contact of relay 78 for operatively energizing the upper winding of relay 70; closes a circuit for operating relay 76; connects ground to the sleeve conductor 93 of the two-way trunk circuit TWT1; disconnects the winding of relay 56 from the sleeve conductor 93; connects the winding of the supervisory relay 55 to the front contact of the signaling relay 90 of the composite signaling circuit CS1; and disconnects the front contact of signaling relay 90 from conductor 95 leading to the windings of relays 100 and 101 of the two-way trunk circuit TWT1. The operation of relay 64 closes circuits for operating relays 60 and 61, connects ground to sleeve conductor 93 and connects ground through its middle lower front contact, back contacts of relays 79 and 66, and conductor 52 to the ring conductors of jack J1 and plug FP. The ground connected to conductor 93 guards against seizure of trunk T1 by a toll route selector such as AS1 and operates relay 115. Relay 115 locks and disconnects the windings of relays 100 and 101 from conductor 95. The operation of relay 69 opens the locking circuit of relay 68, but relay 68 holds under control of relay 54. It is the function of slow-release relay 68 and slow-to-operate relay 69 to prevent the release of relay 70, if operated, before the plug FP is fully seated in jack J1. The operation of relay 76 maintains the operative energization of the upper winding of relay 70 independent of relay 78. The armatures of signal relays 90 and 190 are normally held in the position shown in the drawings by the energization of the upper biasing windings of these relays. The operation of relay 70 closes a circuit from signaling battery B1, through resistor 75, front contact of relay 70, retard coil 89, middle winding of relay 90, upper windings of retard coils 86, over the upper conductor of trunk T1, upper windings of retard coils 186, middle winding of relay 190, retard coil 189, back contact of relay 170, and back contacts of relays 210 and 211 to ground. The closure of this circuit operates relay 190 and constitutes seizure of trunk T1 to effect guarding of the trunk as busy as hereinafter described. Any variation in the energization of the middle, operating windings of relays 90 and 190 due to difference in ground potential between the offices terminating trunk T1 is compensated by the energization of the lower, biasing windings of these relays in a ground to ground circuit through the lower conductor of trunk T1. The operation of relay 60 closes contacts for holding the busy lamps BL1 lighted. Relay 60 also closes a network comprising resistors 72, 73 and 74, ballast lamp 71 and the middle, biasing winding of relay 70. The ballast lamp has a high temperature coefficient of resistance and variations in its resistance due to variations in the voltage of signaling battery B1 affects the energization of the middle winding of relay 70 so as to compensate for changes in the voltage of the signaling battery. The use of the ballast lamp, network of resistors, and biasing winding of relay 70 to compensate for changes in the voltage of the signaling battery B1 is disclosed and claimed in Patent No. 2,174,006 granted Sept. 26, 1939, to O. R. Miller. Relay 61 closes a circuit from battery through resistor 67 and the back contact of relay 66 for holding the normally operated pad control relay 83. The normally closed circuit for operating relay 83 includes the lower back contact of relay 61, resistor 62, and back contacts of relays 117 and 107 of the two-way trunk circuit TWT1.

When the circuit of slow-to-release relay 26 is opened by the operation of relay 28, as hereinbefore described, relay 26 remains operated for an interval long enough for relay 69 of trunk circuit OT1 to have been operated, at which time a circuit is closed for holding relay 27 operated and for operating relays 29 and 78. This circuit is traced from battery through the winding of relay 27, winding of relay 29, upper front contact of relay 27, upper back contact of relay 32, upper front contact of relay 24, inner left front contact of relay 10, contacts of ringing key RK, tip conductors of plug FP and jack J1, conductor 51, back contact of relay 66, winding of relay 78, to ground at a front contact of relay 69. The operation of relay 29 closes a circuit for operating relay 31. Relay 31 closes a circuit for operating relay 32, and closes a circuit from battery through resistor 34, upper front contact of relay 31, impulse contacts of the dial D1, winding of relay 35, back contact of relay 26, front contacts of relays 24 and 10, ring conductors of plug FP and jack J1, conductor 52, back contacts of relays 66 and 79, and through resistor 65 to ground at a front contact of relay 64. Relay 32 opens the circuit through the windings of relays 27 and 29 and connects the tip conductor of plug FP through resistor 33 to battery to hold relay 78 operated. Although relays 27 and 29 release, relay 31 is held by relay 32 and relay 32 is held under control of the dial key. Relay 31 holds relays 20 and 24.

The operation of relay 78 closes a circuit for operating relay 79 and opens the circuit through the winding of relay 76. Relay 79 locks under control of relay 69 and connects the operating winding of the impulse relay 70 in series with conductor 52 and the impulse contacts of the dial D1. Since the operation of relay 78 disconnects the battery at its inner lower back contact from the operating winding of relay 70 and the release of relay 76 disconnects the battery at its front contact from this winding of relay 70, relay 70 is now ready to respond to impulses created by the operation of dial D1. The lower biasing winding of relay 70 is connected in series with a battery of the same voltage as the dialing battery so as to compensate for variations in the voltage of this battery.

The required toll route number is dialed and also the local office code and number of the called subscriber if the called subscriber's line is in a dial office. The impulse relay 70 repeats the dial impulses over trunk T1 to relay 190 of the composite signaling circuit CS2. Each time the dial is moved off-normal relay 37 operates to hold relays 32 and 31 operated, independent of the dial key. When dialing is completed, key DK is restored and relay 37 releases; relays 32, 31, 24 and 25 release in succession and the plug FP is thereby reconnected to the operator's telephone set. While the talking key TK is operated, supervisory signals are received over the sleeve conductor of plug FP by the marginal relay 22 and relay 22 controls the supervisory lamp FL. When the talking key TK is restored to normal relays 10, 20, 21, 22 and 23 are released and the lamp FL is controlled through the sleeve conductor of plug FP by the supervisory relay 55 of the trunk circuit OT1. The release of relay 32 opens the circuit through resistor 33 and the tip conductor of plug FP to cause the release of relay 78 and thereby reconnect battery through the lower contact of relay 78, to hold relay 70, before the release of relay 31 opens the dialing circuit, relay 31 being slow in releasing. The release of relay 78 closes circuits including a front contact of relay 79 for operating relay 66 and reoperating relay 76. Relay 66 disconnects conductors 51 and 52 from the winding of relay 78 and contacts of relay 79, opens the circuit through resistor 67 and relay 83, and connects conductors 51 and 52 through the windings of retard coil 60, and front contacts of relay 61, through windings of relays 63 and 77 in parallel, thence through the winding of pad control relay 83 to ground. The pad control relay 83 is thereupon held operated in series with resistors 11 and 12 of the position circuit PC1 as long as the talk key of cord C1 is operated. After the talk key is restored and relay 10 releases, the pad control relay 83 is controlled through the tip and ring conductors of the calling line or trunk with which plug RP is connected; if under this condition relay 83 releases, relay 84 operates to short-circuit the transmission pads P1 and P2. Relay 66 also opens the normally connected voice frequency repeater termination comprising a resistor and condenser and a back contact of relay 56.

The aforementioned operation of relay 190 upon seizure of the outgoing trunk circuit OT1 closes a circuit from ground through the front contact of relay 190, back contacts of relays 158 and 160 of outgoing trunk circuit OT2, conductor 195, back contact of relay 215 of two-way trunk circuit TWT2, back contact of relay 202, to the winding of relay 200. Relay 200 operates, disconnecting relay 215 from conductor 193, connecting ground to conductor 193 to guard trunk T1 from seizure by a toll route selector such as AS2, and operating relay 156 of the outgoing trunk circuit OT2. Relay 156 connects battery to the sleeve of the outgoing jacks J5 so as to make these jacks test busy and closes a circuit for operating relay 160. Relay 160 closes a circuit for lighting the busy lamps BL5. Although relay 160 opens the normally closed connection between front contact of relay 190 and conductor 195, relay 156 maintains a connection between the front contact of relay 190 and conductor 195 so as to hold relay 200 operated. Relay 200 also closes a circuit for operating relay 201 of two-way trunk circuit TWT2 and relay 225 of toll route selector TS2. This circuit is traced from ground at the front contact of relay 190, back contact of relay 158, front contact of relay 156, conductor 195, back contact of relay 215, winding of relay 201, back contact of relay 216, winding of marginal relay 206, front contact of relay 200, thence in simplex through both windings of differential relay 205, back contacts of relay 161, windings of retard coil 180, conductors 181 and 182, front contacts of relay 200, conductors 221 and 222, back contacts of relay 229 of selector TS2, and through resistors 231 and 232 to and through resistor 230 and a back contact of relay 229 to the winding of relay 225. Relay 206 does not operate because it is marginal and relay 205 does not operate because its windings are differentially energized. The operation of relay 201 causes the operation of slow-to-release relay 202. After relay 202 operates, relay 200 is held operated through resistor 204 to ground at front contacts of relays 201 and 202. Relay 202 connects ground from the back contact of relay 216 to the sleeve conductor 223 of selector TS2 so as to control the release of this selector as hereinafter described. Relay 219 is normally operated in series with the upper winding of relay 207 and in series with resistor 203 in parallel with resistor 220 of selector TS2. The connection between the winding of relay 219 and resistor 220 includes a front contact of relay 219, conductor 224, contacts of the "11th rotary step" springs, and a back contact of relay 229. Relay 207 is marginal and is not normally operated. After relay 202 operates, relay 219 is held operated in series with resistor 220 until relay 229 operates as hereinafter described. The operation of relay 225 closes a circuit for operating the slow-to-release relay 226. Relay 226 connects ground to the sleeve conductor 223 and also connects ground through its outer lower front contact to an alarm circuit so that an alarm will be actuated in case no impulses are received by relay 225 within a predetermined interval of time.

When the calling operator dials the first digit of the toll route number, the impulses are repeated by relay 70 of the outgoing trunk circuit OT1 over the tip conductor of trunk T1 to relay 190 of the composite signaling set CS2. The release and reoperation of relay 190 in response to each impulse causes a corresponding release and reoperation of relays 201 and 225. Being slow in releasing, relays 202 and 226 remain operated during the response of relays 201 and 225 to the dial impulses. The release of relay 225 in response to the first impulse closes a circuit for operating the vertical stepping magnet 233 and the slow-to-release relay 227. The operation of magnet 233 raises the brushes one step. The vertical off-normal springs VON are actuated as soon as the shaft of the switch moves out of normal position closing a circuit, which includes the front contact of relay 227, for operating relay 228. The reoperation of relay 225 at the end of the first impulse causes the release of stepping magnet 233. The release and reoperation of relay 225 in response to each succeeding impulse of the train effects a corresponding operation and release of stepping magnet 233, thereby stepping the brushes up to the level corresponding to the digit dialed. When relay 225 remains operated after receiving the last impulse of the series created by the dialing of the first digit of the toll route number, relay 227 releases, opening the operating circuit for relay 228 and closing a circuit for operating the rotary-stepping magnet 234. Relay 228 is held operated through its upper front contact until magnet 234 operates. The operation of magnet 234 steps the brushes into engagement with the first set of terminals in the level selected in response to the dial impulses. The release of relay 228 causes the release of magnet 234. If this set of terminals is busy, the test brush 237 encounters a ground potential which is effective to cause the reoperation of relay 228, the winding of relay 228 being connected through contacts of the VON springs, the back contact of magnet 234, and a back contact of relay 229 to brush 237. The reoperation of relay 228 causes the reoperation of magnet 234 to step the brushes to the next set of terminals. The operation of magnet 234 again causes the release of relay 228 and the release of relay 228 causes the release of magnet 234. This cycle of operations is repeated to advance the brushes step-by-step until test brush 237 encounters a terminal which is not marked by ground potential connected thereto. Whereupon relay 229 is operated by the current in a circuit from battery through the winding of relay 228, contacts of the VON springs, back contact of magnet 234, winding of relay 229, normally closed contact of the "11th rotary step" springs, to ground on sleeve conductor 223. Being marginal, relay 228 does not operate in series with relay 229. Relay 229 disconnects relay 225 from the conductors 221 and 222 and connects these conductors through brushes 235 and 236 to the line relay, which is not shown in the drawing of the auxiliary toll route selector AS2. The ground potential connected through the back contact of relay 216 and upper front contact of relay 202 to sleeve conductor 223 is extended through a front contact of relay 229 to the test brush 237 to mark the selected auxiliary toll route selector as busy and thereby prevent its seizure by any other toll route selector having access thereto. Relay 225 releases causing the release of relay 226; and relay 226 disconnects ground from the alarm circuit. The operation of relay 229 disconnects resistor 220 from conductor 224 and connects conductor 224 through brush 230 to selector circuit AS2 in which there is a connection through a resistor similar to resistor 220 to hold relay 219 operated.

It is assumed that the desired toll route number is a two-digit number in which case there are no intermediate selectors between selector TS2 and selector AS2. If a large number of toll routes is required there will be one or more additional selectors in the train required for selecting a desired toll route; and if one selector is sufficient the selector TS2 will have direct access to the groups of trunks, which in the system shown, are connected to the banks of the auxiliary selectors AS2. Upon the dialing of the second digit of the toll route number, the auxiliary toll route selector AS2 is directively operated to select a desired group of trunks and automatically operated to seize an idle trunk in the selected group. The selector AS2 may have access to trunks to local offices, either manual or dial, to toll lines extending to toll subscribers or to other toll offices, to incoming trunk circuits such as IT2 terminating at the positions of a toll board, and to groups of intertoll dialing trunks, one of such groups being represented by trunk T1 and another by trunk T3.

Assume that the dialed toll route number effects the operation of selectors TS2 and AS2 to select the incoming trunk circuit IT2 terminating in a jack J7 at an operator's position comprising a cord C2 and position circuit PC2. Relay 201 of two-way trunk circuit TWT2 is held operated and relay 251 of the incoming trunk circuit IT2 is operated by the current in a circuit from ground through the front contact of relay 190, back contact of relay 158, front contact of relay 156, conductor 195, back contact of relay 215, winding of relay 201, back contact of relay 216, winding of relay 206, front contact of relay 200, thence in simplex through both windings of relay 205, back contacts of relay 161, both windings of retard coil 180, conductors 181 and 182, front contacts of relay 200, conductors 221 and 222, front contacts of relay 229, brushes 235 and 236, through the selector AS2, conductors 241 and 242, both windings of retard coil 245, and through resistors 246, 248 and 249 to the winding of relay 251. The resistors 246, 248 and 249 are so chosen that the current through one side of the simplex is enough stronger than the current through the other side of the simplex to cause the operation or differential relay 205; but relay 205 is almost immediately released because the simplex is balanced as soon as the normally operated relay 271 releases due to the operation of relay 256 as hereinafter described. The current in the simplex circuit is not strong enough to operate marginal relay 206. Relay 251 closes a circuit for lighting answering lamp AL7, connects the source of ringing current 250 through condenser 275 to talking conductor 262, thereby transmitting ringing tone to the calling operator to indicate that an operator is being signaled. At the same time that the simplex circuit is closed for operating relay 251, a circuit is closed for holding relay 219 operated, for operating marginal relay 207 of the two-way trunk circuit TWT2, and for operating relay 256 of the incoming trunk circuit IT2; this circuit is traced from ground through the upper winding of relay 207, winding and front contact of relay 219, conductor 224, back contact of the "11th rotary step" springs of selector TS2, front contact of relay 229, brush 238, through selector AS2, conductor 244, back contact of relay 274 and the lower winding of relay 256. Relay 207 locks through its lower winding and a front contact of relay 202. Relay 256 locks through its upper winding to the holding ground connected to conductor 243 from the back contact of relay 216 of the two-way trunk circuit TRT2. Normally relay 271 is held operated in a circuit including resistors 266, 267, 268 and 269 and the winding of relay 270 ond including the back contact of relay 256. Although relay 271 is shown as a polarized relay, it may be a sensitive non-polarized relay. When relay 256 operates, relay 271 releases, thereby opening the short circuit around resistor 247 and closing a short circuit around resistor 248 so as to balance the simplex circuit and cause the release of relay 205. With relay 205 released and relay 207 operated, relay 183 releases, and relay 184 operates short-circuiting pads P1 and P2.

Figure 1:
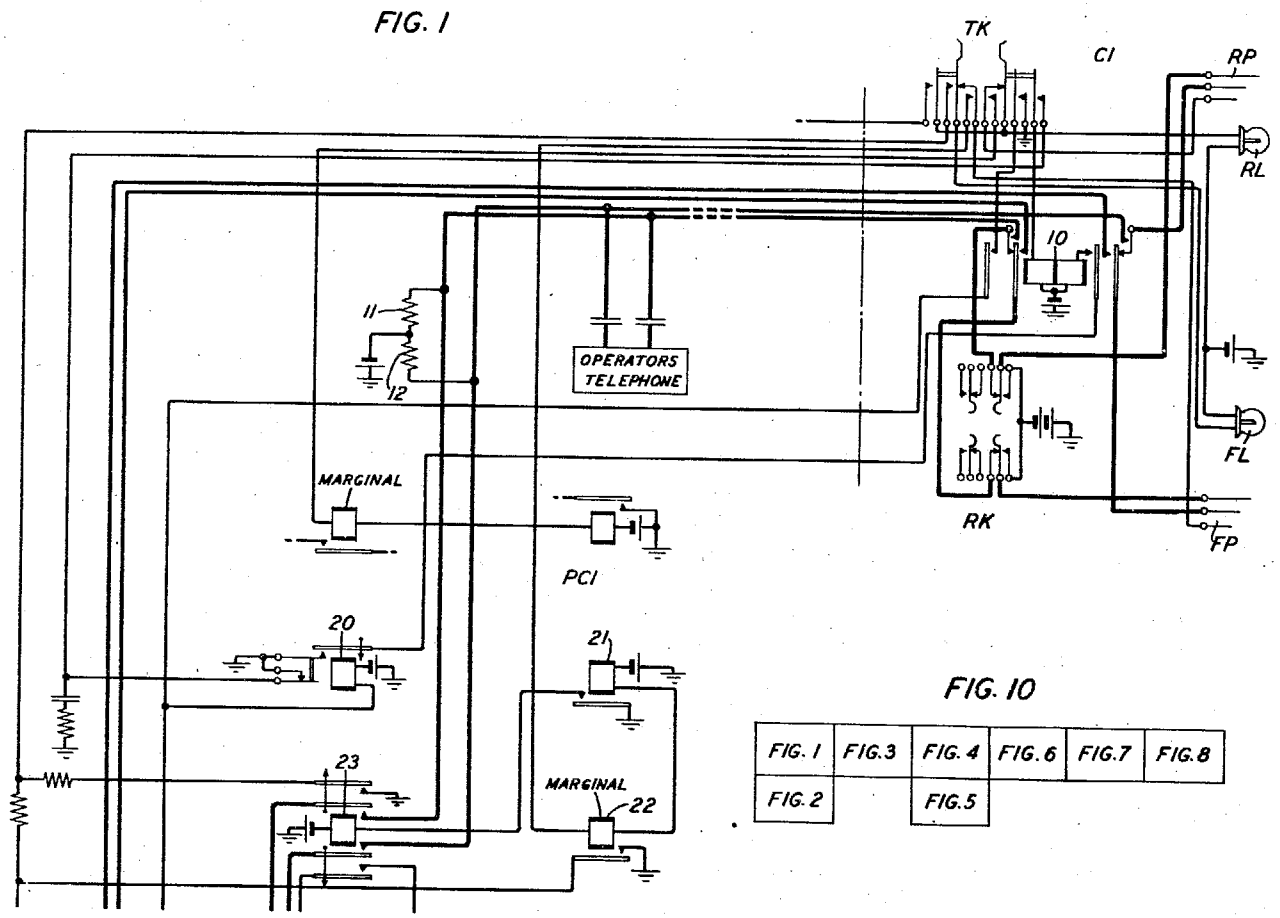
Fig. 1 shows an operator's cord C1 and position circuit PC1.
Figure 2:
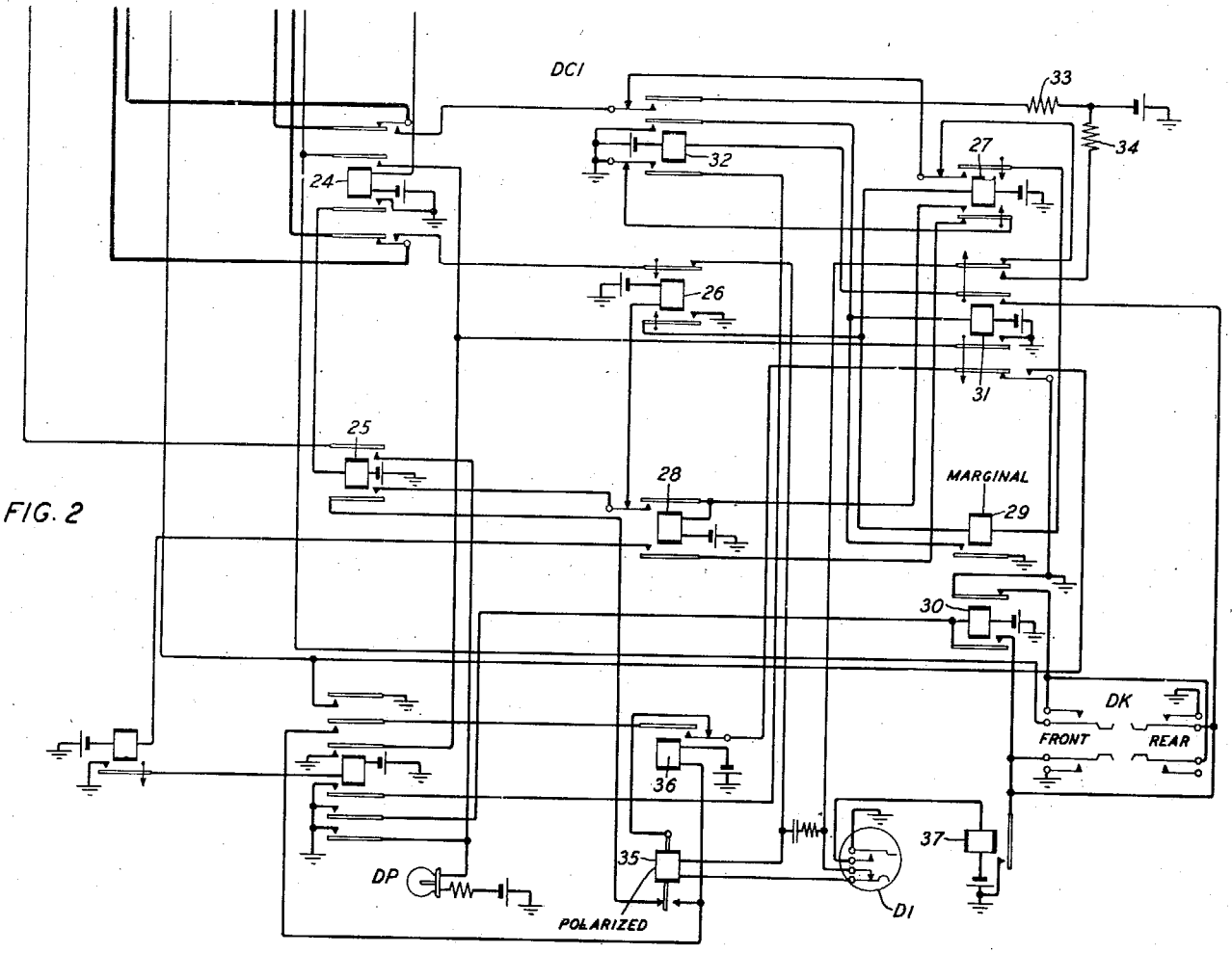
Fig. 2 shows a dial circuit DC1 associated with the position circuit PC1 of Fig. 1.
Figure 3:
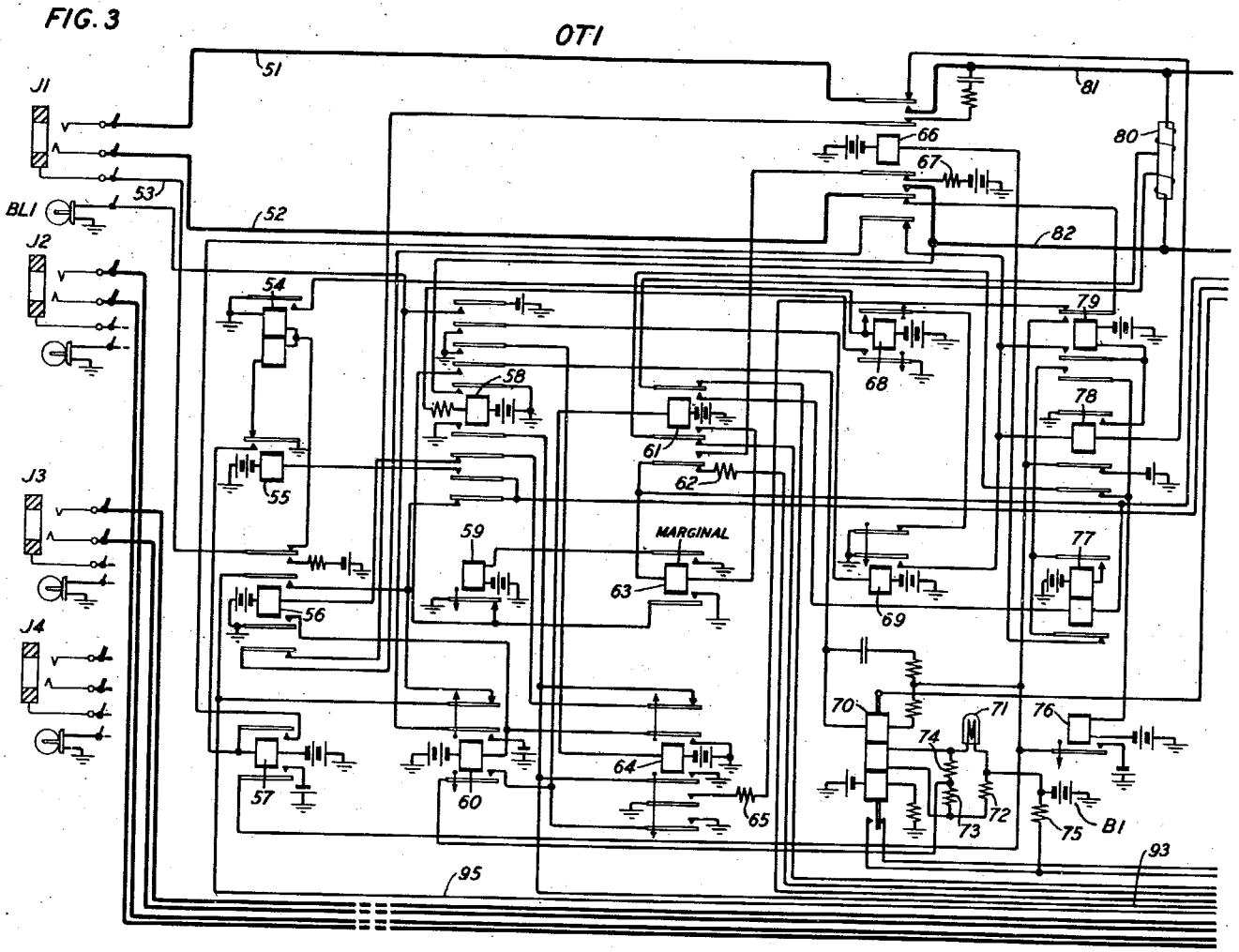
Fig. 3 shows outgoing jacks J1 and J2, answering jacks J3 and J4, and an outgoing trunk circuit OT1 associated with jack J1.
Figure 4:
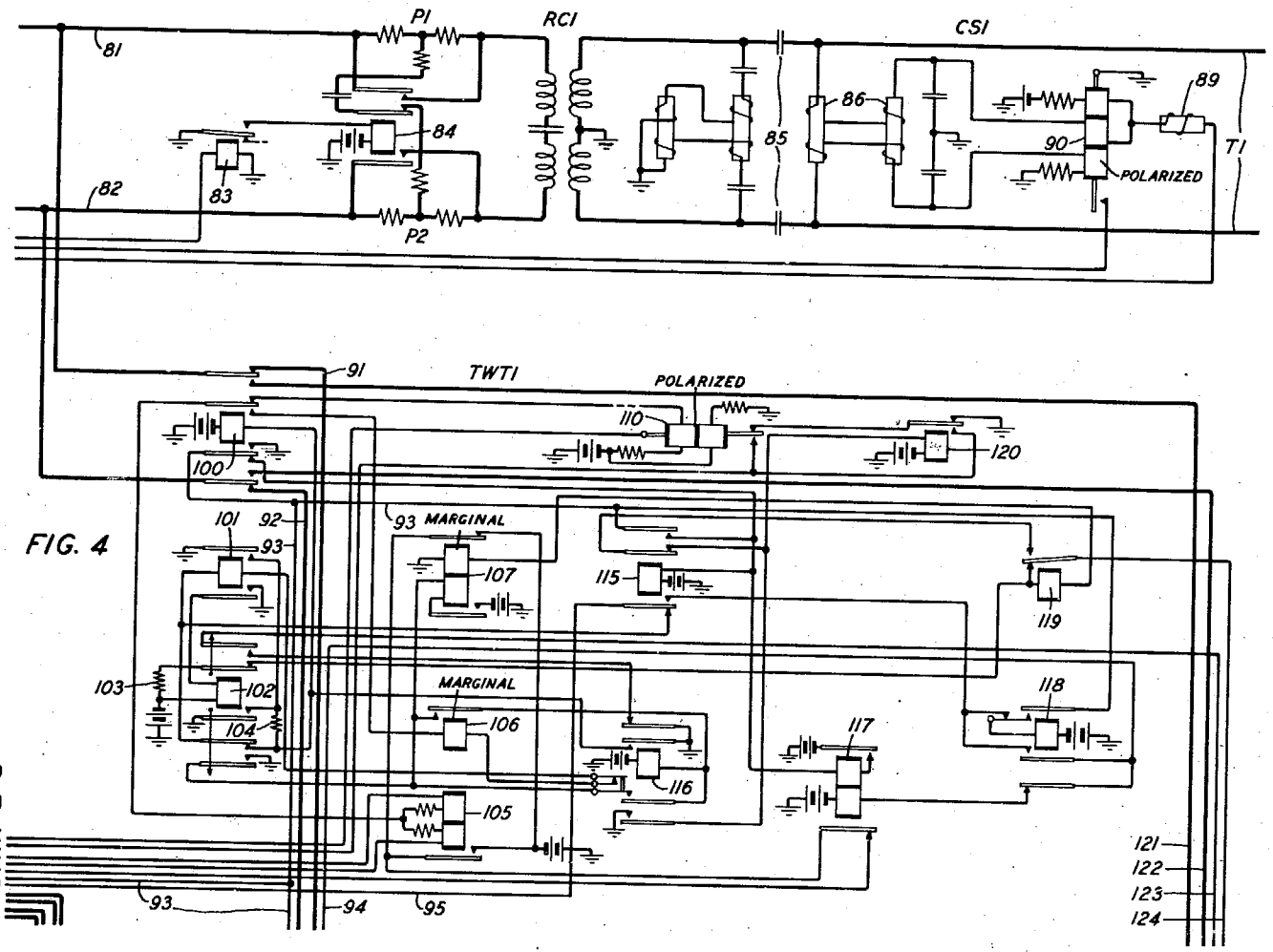
Fig. 4 shows a two-way trunk circuit TWT1 and a composite signaling circuit CS1 connected to one end of a toll line T1 and to the outgoing trunk circuit OT1 of Fig. 3.
Figure 5:
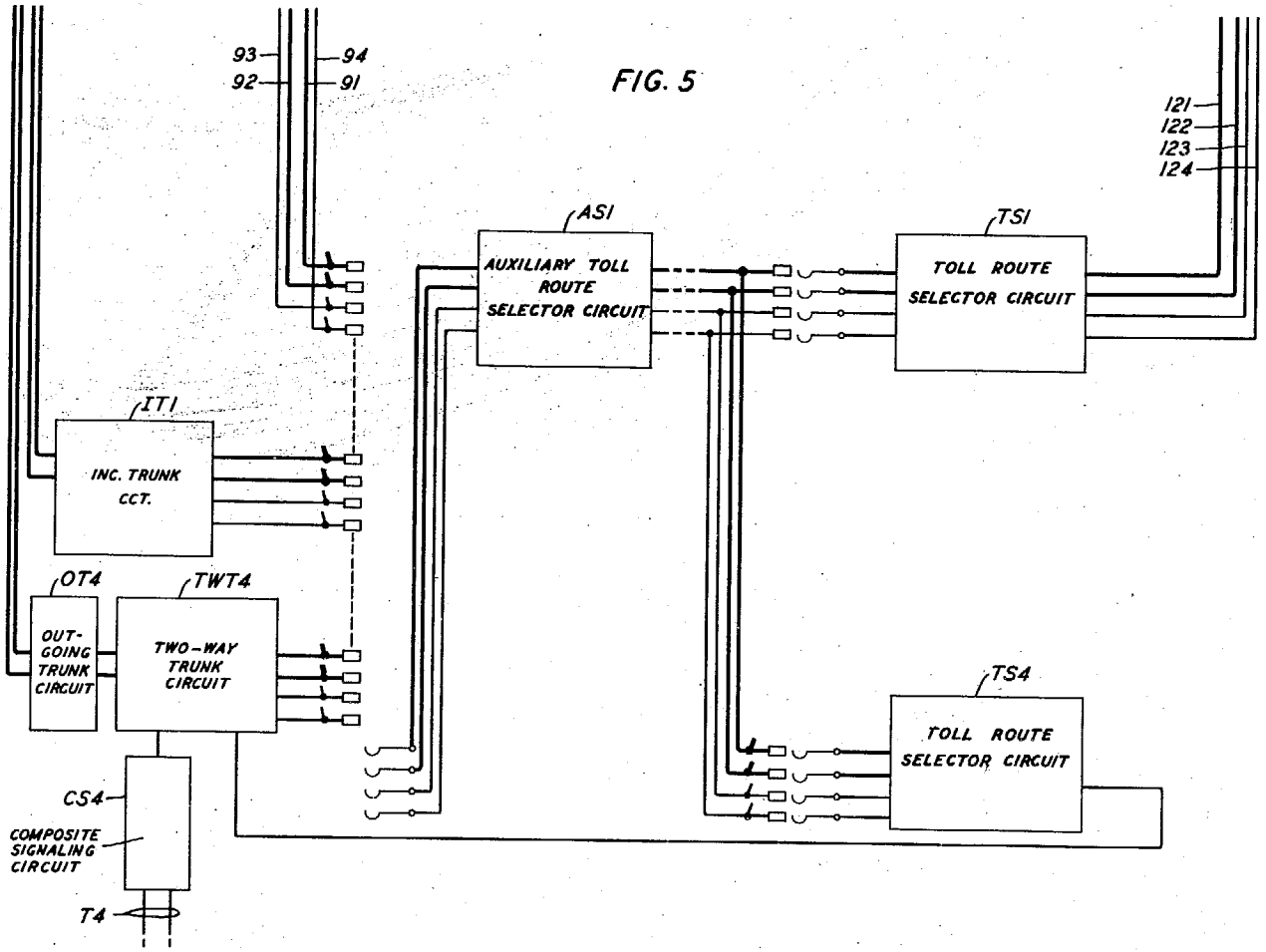
Fig. 5 shows a toll route selector TS1 associated with the two-way trunk circuit TWT1 of Fig. 4 an auxiliary toll route selector AS1 and an incoming trunk circuit IT1 associated with the answering jack J3 of Fig. 3.
Figure 6:
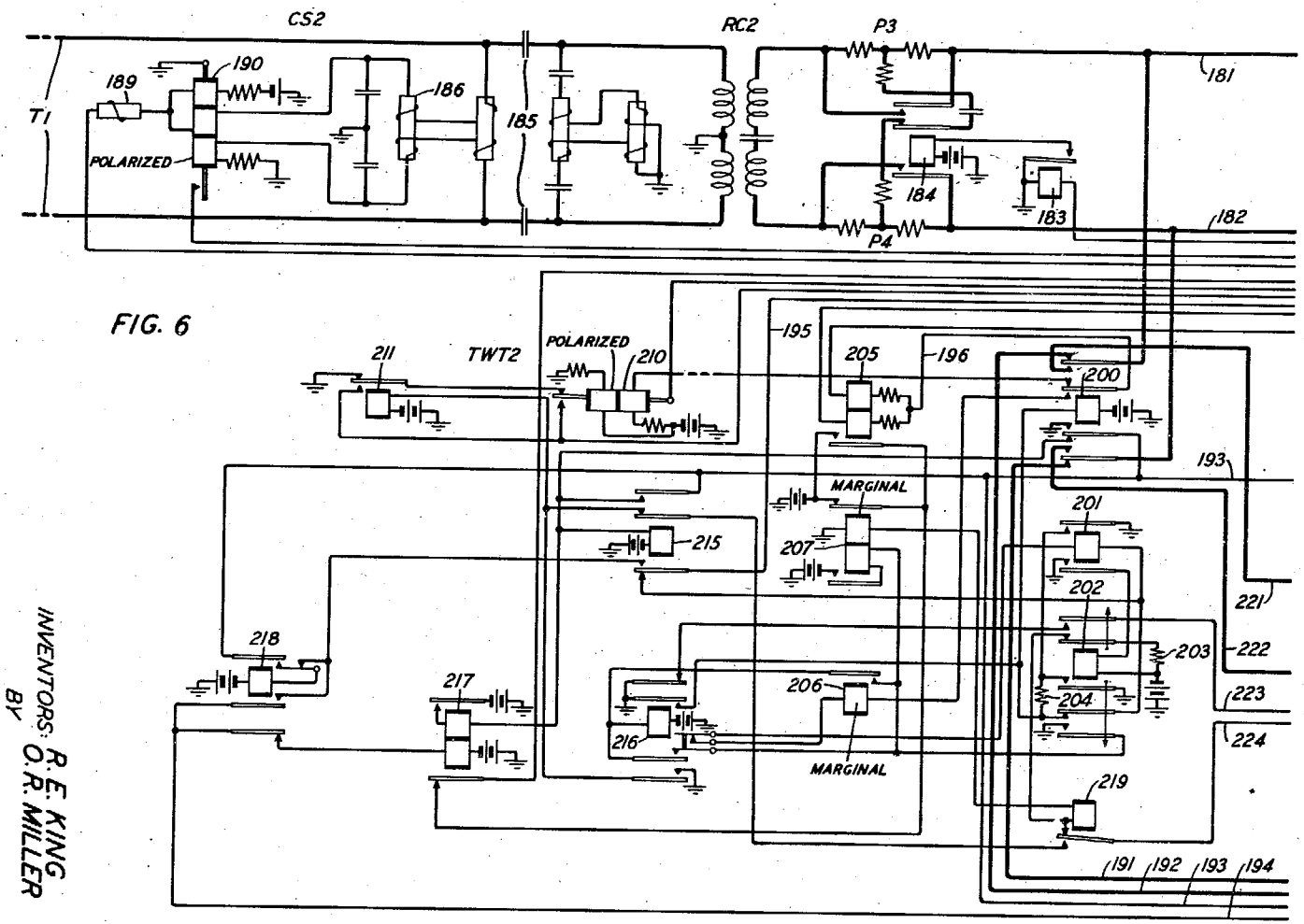
Fig. 6 shows the composite signaling circuit CS2 and two-way trunk circuit TWT2 connected to the other end of the toll line T1.

When a plug of a cord C2 is inserted in jack J7 to answer the incoming call, relay 272 is operated since there is battery connected to the sleeve of the plug, the cord C2 and position circuit PC2 being similar to cord C1 and position circuit PC1 shown in Fig. 1. Relay 272 closes a circuit for operating relay 273. Relay 273 closes a circuit, which includes a front contact of relay 251, for operating relay 274. Relay 273 also disconnects the repeater termination comprising condenser 276 and resistor 277 from conductor 261. This termination, normally connected across conductors 261 and 262, prevents the voice-current repeater of a connected intertoll trunk from singing prior to answer of a call by an operator. Relay 274 locks to the ground connected to sleeve conductor 243, opens the ringing tone connection, extinguishes lamp AL7, disconnects the supervisory conductor 244 from the operating winding of relay 256, and connects this conductor in series with a back contact of relay 270 to ground at a front contact of relay 273, thereby causing the release of relay 219 of two-way trunk circuit TWT2. The release of relay 219 disconnects its winding from conductor 224 and connects this conductor through the upper back contact of relay 215, to the winding of the answering supervisory relay 211. Relay 211 operates thereby connecting battery through resistor 175, front contact of relay 211, the back contacts of relays 210 and 170, and retard coil 189 to the windings of relay 190 thereby causing the operation of relay 90 at the other end of trunk T1. Relay 90 closes a circuit for operating supervisory relay 55. Relay 55 opens the circuit through the low-resistance, lower winding of relay 54. Since the upper winding of relay 54 is a high-resistance winding, the current in the circuit through the sleeve conductor of plug FP and lamp FL is reduced to extinguish lamp FL to indicate to the calling operator that the call has been answered.

The pad control relay 271 is held operated in a simplex circuit through the conductors 261 and 262 to battery, through pad control resistors similar to resistors 11 and 12 of position circuit PC1, in the operator's position circuit PC2 as long as the talking key of cord C2 is operated. When the connection is extended through the other end of cord C2 to a trunk or line and the talking key of cord C2 is restored to normal, relay 271 is controlled by the trunk or line to which the other end of cord C2 is connected. If the connected trunk is a local trunk or other low-loss line, relay 271 is held operated in the circuit through cord C2 and pad control resistors in the connected trunk or line, similar to the pad control resistors in the operator's position circuit. If the connected trunk is an intertoll trunk or other high-loss line, relay 271 releases since the connected trunk or line circuit is not provided with pad control resistors and the impedance in series with the winding of relay 271 is infinite. If relay 271 releases, it unbalances the simplex circuit to cause the reoperation of relays 205 and 183 and release of relay 184 thereby opening the short circuit around pads P3 and P4. If relay 271 is held operated, the simplex is balanced, relays 205 and 183 are not operated, and relay 184 short-circuits the pads P3 and P4.

The calling operator can recall the answering operator by operating the ringing key to the lower position to connect signaling battery to the tip conductor of plug FP, the battery having a high enough voltage, for instance 45 to 50 volts, to operatively energize the winding of relay 63. Relay 63 closes a circuit for operating relay 59 and a circuit for holding relay 70 operated. When the ringing key is restored to normal relay 63 releases. After relay 63 releases and before the slow-to-release relay 59 releases, relay 70 releases thereby temporarily transferring the upper signaling conductor of trunk T1 from battery to ground to cause the release and reoperation of relay 190. The release and reoperation of relay 190 causes the release and reoperation of relays 201 and 251. Being slow in releasing, relay 202 remains operated. The release of relay 251 causes the operation of relay 252. Relay 252 connects the low-resistance winding of relay 254 in parallel with the high-resistance winding of relay 272, thereby causing the cord supervisory lamp (not shown) to light. Relay 254 operates and locks. When relay 251 reoperates, relay 252 releases and interrupter I is connected to the winding of relay 257. Relay 257 is alternately operated and released 120 times a second under the control of interrupter I. Each time relay 257 operates, it closes a holding circuit for relay 254 and disconnects the low-resistance winding of relay 254 from the sleeve conductor 263 so that the cord supervisory lamp is extinguished. The cord lamp is thus flashed to signal the operator until the talking key of the cord is operated to answer the recall. When the talking key is operated, marginal relay 254 releases but relay 272 remains operated. The release of relay 254 disconnects the winding of relay 257 from interrupter I.

If the answering operator wishes to signal the calling operator, operation of the ringing key connects battery of a high enough voltage to conductor 261 to operate the marginal relay 270. While the ringing key and relay 270 are operated, ground is disconnected from conductor 244 releasing relay 211. The release of relay 211 causes the successive release of relays 90 and 55 at the calling end of trunk T1. Relay 55 reconnects the low-resistance lower winding of relay 54 in parallel with the high-resistance upper winding to light the lamp FL of cord C1 to recall the operator.

If the answering operator disconnects cord C2 from trunk circuit IT2 while the calling cord C1 remains connected with outgoing trunk circuit OT1, relays 272 and 273 release. Relay 273 reconnects condenser 276 and resistor 277 across conductors 261 and 262, disconnects ground from conductor 244 to release relay 211 and thereby signal the calling operator as described in the preceding paragraph, and closes a circuit for operating relay 255. Relay 255 connects battery to both windings of retard coil 245, the current through the winding of marginal relay 206 of the two-way trunk circuit TWT2 being increased sufficiently to cause its operation. Relay 206 closes a circuit for operating relay 216; and relay 216 locks under control of relay 202. The operation of relay 216 disconnects ground from conductor 223, thereby causing the release of relay 229 of selector TS2, the release of the corresponding relay in selector AS2, and the release of relays 256 and 274 of incoming trunk circuit IT2. The release of relay 229 closes a circuit for operating release magnet 239 and the shaft and brushes of selector TS2 are thereupon restored to normal. The opening of the upper contacts of the VON springs, when the shaft reaches normal position, releases the magnet 239. The shaft and brushes of selector AS2 are restored to normal in like manner. The aforementioned operation of relay 216 causes the release of relays 201, 205 and 206 but holds relay 200 operated. Relay 216 also closes a circuit for holding relay 211. The release of relay 201 causes the release of relay 202; and relay 202 releases relays 216 and 211. The release of relay 211 again causes the lighting of lamp FL of cord C1 and the release of relay 216 recloses the circuit hereinbefore described for operating relays 201 and 205 and relay 225 of selector TS2. Relay 201 again closes the circuit for operating relay 202; and relay 202 reconnects ground from the back contact of relay 216 to conductor 223. The calling operator may now reconnect the dial to cord C1 and reoperate selector TS2 and succeeding switches to complete another call without trunk T1 having been released between calls. By reoperating the talking key TK, relays 10, 20, 21, 22 and 23 are reoperated; and by reoperating the dial key DK, relays 24, 25, 26, 27 and 28 are reoperated. The operation of relay 28 causes the release of relay 26; relay 27 holds and relay 29 operates through the tip conductor of plug FP in series with the windings of relays 63 and 83. Relay 63 is marginal and does not operate in this circuit since the voltage of the battery connected to the winding of relay 27 is only a 24-volt battery. The operation of relay 29 causes the successive operation of relays 31 and 32 and the release of relay 27 thereby again connecting battery through resistor 34 to the ring conductor of plug FP, thence through conductor 52, front contact of relay 66, lower winding of retard coil 80, front contact of relay 61, lower winding of relay 77 and winding of relay 83 to ground. Relay 77 operates and locks through its upper winding under control of relays 79 and 78. The operation of relay 77 causes the release of relay 66. Relay 66 again closes the circuit from battery through resistor 33 and the tip conductor of plug FP for operating relay 78. With relay 78 operated, the upper operating winding of relay 70 is under the operative control of the impulse contacts of the dial D1 and the dialing of another toll route number results in the reoperation of selector TS2 and an auxiliary selector AS2 as above described.

When the calling operator disconnects cord C1 from trunk OT1, relay 54 releases. Relay 54 releases relay 68. Relay 68 releases relay 58. Relay 58 releases relays 70, 64 and 69 and also relays 55 and 76, if operated. Relay 64 releases relays 60 and 61. Relay 69 releases relays 79 and also relay 78, if operated. The release of relay 70 disconnects signaling battery B1 from the upper signaling conductor of trunk T1 thereby causing the release of relay 190. The release of relay 190 opens the circuit through the winding of relay 201 causing its release, the release of relay 205, if operated, and the release of relay 251 of trunk circuit IT2, if trunk T1 has been extended to trunk IT2, or the release of relay 225 if trunk T1 is extended only to selector TS2, or the release of the line relay of any other selector, trunk or toll line with which trunk T1 is connected. The release of relay 201 causes the release of relay 202. The release of relay 202 causes the release of relay 200, the release of relay 207, if operated, and the reoperation of relay 219. Relay 202 also disconnects ground from conductor 223, causing the release of relay 229 of selector TS2, the release of the corresponding relay of selector AS2, and the release of relays 256 and 274 on a connection to trunk circuit IT2. The release of relay 229 causes the return of selector TS2 to normal as hereinbefore described. Relays 272 and 273 remain operated until cord C2 is disconnected from jack J7.

If during the dialing of a toll route number, a toll route selector such as TS2 or AS2 or a selector of a toll train in a local dial office to which the connection is extended encounters an all-trunks-busy condition, relay 55 is alternately operated and released to flash lamp FL. Assuming it is selector TS2 which finds all trunks busy in a selected level, the "11th rotary step" springs are actuated, disconnecting the winding of relay 229 from conductor 223, disconnecting conductor 224 from resistor 220 to release relay 219, and connecting interrupter I to conductor 224 to cause the intermittent operation of relay 211. Relay 211 causes the alternate operation and release of relay 90; and relay 90 in turn causes the alternate operation and release of relay 55 to flash lamp FL. If the selector which encounters an all-trunks-busy condition is arranged to camp on the busy level and wait for a trunk to become idle, relays 90 and 55 are alternately operated and released in similar manner but at a different rate. The operation of relay 55 causes the operation of relay 57 and relay 57 locks through a back contact of relay 66 to ground at a front contact of relay 69. Relay 57 connects battery to the operating winding of relay 70 to prevent its further release under control of the impulse contacts of dial D so that further impulses will not be sent out over trunk T1 in case another digit is dialed before the operator takes notice of the camp-on signal. The operator thereupon restores the talking and dial keys to normal causing the release of relay 78 and operation of relays 66 and 76. The operation of relay 66 releases relay 57 and relay 76 holds relay 70 operated. A selector arranged for camp-on operation is disclosed in Patent No. 2,097,165, granted to R. L. Stokely October 26, 1937. When a trunk becomes idle, the signal is changed and operation of the talking and dial keys causes the reassociation of the dial with trunk OT1 as hereinbefore described. The dialing of the digit 1 will then be effective to send one impulse to the selector in question and thus start its trunk hunting operation. Any additional digits of the toll route number may then be dialed and relay 70 will repeat the dial impulses.

Since the trunk T1 may be seized by toll route selectors such as AS1 at one end and AS2 at the other end, it is necessary that the two-way trunk circuits TWT1 and TWT2 and outgoing trunk circuits OT1 and OT2 be arranged to establish the busy conditions which prevent seizure by another selector or by an operator and to establish the required pad control and through signaling conditions. To illustrate these operations, assume that a trunk T3 is seized by a toll operator in a third office. The associated composite signaling circuit CS3, two-way trunk circuit TWT3, outgoing trunk circuit OT3 and incoming toll route selector TS3 are similar to the corresponding circuits CS2, TWT2, OT2 and TS2 associated with trunk T1 and the operations resulting from seizure of trunk T3 and dialing are similar to those hereinbefore described on the call incoming over trunk T1. Assume further that the incoming toll route selector TS3 is operated to select an auxiliary toll route selector AS2 and that the selector AS2 is operated to select the trunk T1. Upon extension of the connection from trunk T3 through the brushes of selector AS2 to conductors 191, 192, 193 and 194, holding ground potential is connected to conductor 193, ground from the front contact of the signaling relay in the composite signaling circuit CS3 is connected to conductors 191 and 192, and ground through the windings of relays in circuit TWT3 corresponding to relays 207 and 219 in circuit TWT2 is connected to conductor 194 all in similar manner to the connection of ground to conductors 241, 242, 243 and 244 of incoming trunk circuit IT2 on the call hereinbefore described. The connection of ground potential to conductor 193 closes circuits for operating relay 215 of the two-way trunk circuit TWT2 and relay 156 of the outgoing trunk circuit OT2. Relay 215 locks to conductor 193, connects relay 218 to conductor 195 and disconnects the windings of relays 200 and 201 from conductor 195. Relay 156 connects battery to the sleeve of jack J5 as a busy condition and operates relay 160. Relay 160 closes a circuit for lighting the busy lamps BL5. The connection of ground potential from the front contact of the signaling relay of circuit CS3 through circuits TWT3, TS3 and AS2 to conductors 191 and 192, is extended through back contacts of relay 200, conductors 181 and 182, windings of retard coil 180, back contacts of relay 161, windings of relay 205, conductor 196, and back contact of relay 200 to the operating winding of relay 210. The connection of ground to conductor 194 causes the operation of relay 217 of two-way trunk circuit TWT2 and relay 217 locks through its upper winding to the holding ground on conductor 193.

The operation of relay 210 disconnects ground from and connects battery through resistor 175 to retard coil 189 thereby causing the operation of the signaling relay 90 at the other end of trunk T1. The operation of relay 90 connects ground to conductor 95 to cause the operation of relays 100, 101, 102 and 105 of two-way trunk circuit TWT1 and the operation of the line relay (not shown) of selector TS1. Relay 100 connects ground to conductor 93 to guard two-way trunk circuit TWT1 from seizure by an auxiliary toll route selector such as AS1. The connection of ground to conductor 93 also causes the successive operation of relays 56 and 60. Relay 56 connects battery potential to the sleeve of jacks J1 to mark this trunk as busy and relay 60 closes the circuit for lighting busy lamps BL1. The connection between ground at the front contact of signaling relay 90 and conductor 95 is maintained by a front contact of relay 56, although the normal connection is opened at the back contact of relay 60. Relay 56 also opens the repeater termination, comprising a condenser and resistor normally connected across conductors 81 and 82 to prevent the associated voice frequency repeater which is not shown in the drawing from singing. The operation of toll route selector TS1 and an auxiliary selector AS1 is similar to that of selector TS2 hereinbefore described. The aforementioned operation of relay 217 causes the release of relay 183 and the operation of relay 184 to short-circuit pads P3 and P4. Answering supervision is received over trunk T1 by relay 190. The operation of relay 190 closes a circuit including a front contact of relay 215 for operating relay 218. Relay 218 opens its operating circuit, locks to ground on conductor 193 and opens the operating circuit of relay 217. With relays 215 and 218 operated, the connection of ground through the front contact of relay 190 and conductor 195 is extended through conductor 194, selectors AS2 and TS3 through back contacts of the relays in two-way trunk circuit TWT3 which correspond to relays 219 and 215 of circuit TWT2 to the winding of the relay which corresponds to relay 211, thereby transmitting the answering supervisory signal over trunk T3 to the calling operator.

On calls incoming over trunk T1 and extended through selectors TS2 and AS2 to a switching trunk leading to a local office, there is no relay in the outgoing trunk circuit of the switching trunk corresponding to relay 256 of incoming trunk circuit IT2 and therefore relay 219 of two-way trunk circuit TWT2 releases as soon as selector AS2 seizes the switching trunk. The release of relay 219 connects conductor 224 to the winding of relay 211 to operate this relay when the called subscriber in the local office answers. On such a call, relay 207 is not operated and pad control relay 183 is held operated so that the pads P3 and P4 remain in the talking circuit.

On a call incoming over trunk T1 and extended through selectors TS2 and AS2 to trunk T3, the pad control and supervisory operations are similar to those on a call incoming over trunk T3 and extended through selectors TS2 and AS2 to trunk T1.

While the two-way trunks T1 and T3 are shown and described as being arranged for composite signaling it is of course understood that any type of signaling may be employed. For instance in the arrangement shown in Fig. 9, an intertoll trunk T5 terminates in a signaling circuit SC5 arranged for voice frequency signaling and the associated two-way trunk circuit TWT5 is provided with two polarized differential relays controlled in a simplex circuit comprising the talking conductors in parallel. One of these two relays is operated by an unbalance of the simplex which causes a larger current in one side to control the transmission pads and the other relay is operated by an unbalance of the simplex which causes a larger current in the other side to control the repeating of the incoming voice frequency impises in accordance with the type of signaling provided in the outgoing trunk or line to which the connection is extended. In the following description it is assumed that the trunk T5, signaling circuit SC5, and two-way trunk circuit TWT5 are associated with an outgoing trunk circuit and a toll route selector similar to the trunk circuit OT2 and selector TS2 shown in Fig. 7.

When the trunk T5 is seized at its distant end and voice frequency signaling current is transmitted over trunk T5 as a seizure signal, relay 390 is operated. Relay 390 closes a circuit for operating relay 385. Relay 385 closes a circuit for operating the slow-to-operate relay 386 and closes a circuit from ground at the back contact of relay 386, outer front contact of relay 390, inner upper front contact of relay 385, back contacts of relays 158 and 160 of the associated outgoing trunk circuit, conductor 195, back contacts of relays 315 and 324, lower back contact of relay 302, to the winding of relay 300. The operation of relay 300 opens the normally closed operating circuit through the winding of slow-to-release relay 320 and closes a circuit for operating relay 301 and relay 225 of the associated toll route selector TS2. The circuit for operating relays 301 and 225 is traced from ground at the back contact of relay 386, outer front contact of relay 390, inner upper front contact of relay 385, back contacts of relays 158 and 160, conductor 195, back contacts of relays 315 and 324, winding of relay 301, a back contact of relay 316, back contact of relay 324, winding of marginal relay 306, a front contact of realy 300, thence in simplex through resistors 321 and 322, windings of relays 305 and 323, back contacts of relay 161, windings of retard coil 180, conductors 181 and 182, front contacts of relay 300, conductors 221 and 222, resistors 231 and 232, and thence through resistor 230 and the winding of relay 225. Being marginal, relay 306 does not operate. Relay 301 closes a circuit for operating slow-to-release relay 302. After relay 302 operates, relay 300 is held operated in series with resistor 304 under control of both of relays 301 and 302. The operation of relay 302 closes a locking circuit for relay 385 and connects ground at the back contact of relay 316 to sleeve conductor 223 of the associated selector TS2 to control the release of this and succeeding selectors. Being slow in operating, relay 386 does not open its back contact until after the seizure signal is ended and relay 390 has released. When relay 390 releases, it connects ground through its back contact and the inner upper front contact of relay 385 to hold relays 301 and 225 operated. Relay 302 also closes a circuit for operating the slow-to-release relay 325. The slow-to-release relay 320 is normally operated, short-circuiting resistor 322 so that at the time relay 300 operates, the simplex is unbalanced and the current through the lower windings of the polarized differential relays 305 and 323 is larger than the current through the upper windings. Relay 305 is thereby energized in a direction to maintain its armature in normal position but relay 323 is energized in a direction which operates its armature to its alternate position. When relay 320 releases due to the operation of relay 300, the short circuit around resistor 322 is opened causing the release of relay 323. Since relay 323 releases before the slow-to-operate relay 325 has operated, relay 324 also releases. The aforementioned operation of relay 302 also opens a normally closed circuit through resistor 303, the winding of relay 319 and the upper winding of relay 307. Relay 319 is thus normally operated but relay 307, being marginal, does not operate. After relay 302 operates, relay 319 is held operated in series with conductor 224 and resistor 220.

When signaling relay 390 responds to the first train of dial impulses of voice frequency current incoming over trunk T5, relays 301 and 225 are alternately released and reoperated. Slow-to-release relay 302 remains operated during the response of relay 301. The selector TS2 is operated as hereinbefore described to select the desired group and an idle trunk therein whereupon the operation of relay 229 extends the connection to the selected auxiliary toll route selector AS2. The selector AS2 is thereupon controlled by the response of relay 300 to the second train of impulses incoming over trunk T5 to select a desired trunk group and upon seizure of an idle trunk in the selected group the connection is extended thereto.

If the selected trunk is an incoming trunk circuit such as IT2, the operation is similar to that hereinbefore described on the call incoming over trunk T1 to trunk circuit IT2. Relay 307 is operated and relay 319 held operated in series with the lower winding of relay 256 of trunk circuit IT2. Relay 307 locks under control of relay 302 and opens the normally closed circuit for operating pad control relay 383. When the call is answered the connection of ground to conductor 244 causes the release of relay 319 and operation of answering supervisory relay 311. Relay 311 closes a circuit for operating relay 387 of the signaling circuit SC5. Relay 387 closes a circuit for operating the slow-to-operate relay 388. After relay 387 operates and until relay 388 operates, a circuit is closed for operating relay 389. While relay 389 is operated, the source of signaling current VF is connected to the conductors of trunk T5 to transmit an answering supervisory signal to the calling office. If the connection is extended through a cord C2 to a tributary line or trunk, the simplex circuit is unbalanced to cause the operation of the polarized differential relay 305; but if the connection is extended through cord C2 to a toll line, the simplex is balanced and relay 305 does not operate. If relay 305 operates, relay 383 is held operated and the transmission pads remain in the connection; but if relay 305 does not operate, relay 383 releases and relay 384 operates to short-circuit the transmission pads. Rering signals may be transmitted over trunk T5 in both directions. If a rering signal is transmitted from the calling office, the momentary operation of relay 390 in response thereto causes the momentary release of relays 301 and 251; but relay 390 releases and relay 301 reoperates before relay 302 releases, and therefore relay 302 holds relays 385 and 386 operated. If an answering operator transmits a rering signal, the supervisory relay 311 is momentarily released thus effecting the momentary release of relay 387 and momentary operation of relay 389 to connect source VF to trunk T5. Relay 388 is slow in releasing and remains operated; and, when relay 387 reoperates, relay 389 releases. If the answering operator disconnects before the calling operator disconnects, the release of relays 272 and 273 of the trunk circuit IT2 causes the operation of relay 255, thereby connecting battery to both conductors of the simplex to cause the operation of marginal relay 306 of the calling two-way trunk circuit TWT5. The operation of relay 306 closes a circuit for operating relay 316. Relay 316 locks under control of relay 302, closes holding circuits for relays 300 and 311, opens the simplex circuit to release relays 301, 306 and 251, and disconnects holding ground potential from conductor 223 to cause the release of the associated toll route selector and the release of the auxiliary toll route selector AS2 through which the connection with trunk circuit IT2 was established and to cause the trunk circuit IT2 to be restored to normal. The release of relay 301 causes the release of relay 302 and the release of relay 302 causes the release of relays 316, 307 and 311. The release of relay 311 causes the release of relays 387 and 388 and momentary operation of relay 389 to send a disconnect signal to the calling office. The release of relay 316 recloses the circuit for operating relay 301 of the trunk circuit and relay 225 of the associated toll route selector. Relay 301 reoperates relay 302 before relays 325 and 385 have both released so that relay 385 is held operated and the signaling circuit SC5 is ready to repeat the dial impulses of another called route number to selector TS2 and an auxiliary selector AS2 without trunk T5 having been released and reseized by the calling operator. Since relay 388 is slower to release than to operate, the disconnect signal is of longer duration than a seizure signal. When a disconnect signal is received over trunk T5 from the calling office, relay 390 is operated for a long enough time to cause the release of relay 251 and both of relays 301 and 302. The release of relay 302 causes the release of relays 385 and 386, the release of selectors TS2 and AS2, and the release of the trunk circuit IT2.

If on the call incoming over trunk T5, the selected auxiliary toll route selector AS2 is operated to extend the connection to a two-way intertoll trunk circuit such as TWT2, the operation of circuits TWT5 and SC5 are similar to the operations above described on a call to trunk circuit IT2.

Assume next that the two-way trunk circuit TWT5 is selected and seized by an auxiliary toll route selector AS2 on a call incoming over a trunk, such as T1, arranged for composite signaling. In this case, holding ground is connected from circuit TWT2, through sleeve conductors 223, 193 and 393 to operate relay 315 of trunk circuit TWT5 and to guard against seizure of the selected trunk by another selector. Relay 315 locks directly to conductor 393 and causes the release of the normally operated relay 320. Relay 317 of trunk circuit TWT5 is operated by the current in a circuit from battery through its lower winding, lower back contact of relay 318, conductor 394, through selector AS2, brush 238 and conductor 224 of the selector TS2, back contact and winding of relay 219 of the two-way trunk circuit TWT2 of the calling trunk T1 and through the upper winding of relay 207 to ground. Relay 207 is also operated by the current in this circuit and relay 219 is held operated. Relay 317 locks through its upper winding to holding ground potential on conductor 393; and relay 207 locks through its lower winding under control of relay 202. With relay 317 operated, the circuit for operating relay 383 is opened, relay 383 releases, relay 384 operates and the transmission pads are short circuited. The operation of relay 207 places pad control relay 183 under control of relay 205. Another circuit, closed upon seizure of the trunk circuit TWT5, is traced from battery through the winding of relay 310, a back contact of relay 300, thence in simplex through resistors 321 and 322, both windings of the differential and oppositely-poled polarized relays 305 and 323, through back contacts of relay 161 and windings of the retard coil 180 of the outgoing trunk circuit OT2 associated with trunk T5, through back contacts of relay 300, conductors 391 and 392, talking conductors of selectors AS2 and TS2, conductors 221 and 222, front contacts of relay 200, conductors 181 and 182, windings of retard coil 180 and back contacts of relay 161 of the outgoing trunk circuit OT2 associated with the calling trunk, both windings of relay 205, conductor 196, front contact of relay 200, winding of relay 206, back contact of relay 216, winding of relay 201, back contact of relay 215, conductor 195, front contact of relay 156, back contact of relay 158, to ground at the front contact of signaling relay 190. Relay 201 is held operated and relay 310 is operated by the current in this circuit. At the time this circuit is first closed, the simplex is unbalanced because resistor 322 is short-circuited by the normally operated relay 320; and for this reason relay 323 may be momentarily operated. The momentary operation of relay 323 may cause the operation of relay 324 but relay 324 cannot lock since relay 325 is not operated. When the short circuit around resistor 322 is opened by the release of slow-to-release relay 320, the simplex is balanced and relays 323 and 324 release. Relays 205 and 305 do not operate because the differential energization of these polarized relays before the simplex is balanced is in a direction to maintain the armatures in normal position. With relay 205 normal and relay 207 operated, pad control relay 183 releases, relay 184 operates and pads P3 and P4 are short-circuited. The aforementioned operation of relay 310 upon seizure of trunk circuit TWT5 closes a circuit from battery through resistor 175 of the associated outgoing trunk circuit, back contact of relay 324, front contact of relay 310, back contact of relay 170 of the outgoing trunk circuit, and winding or relay 387. Relay 387 operates closing circuits for operating relays 388 and 389. Relay 389 connects signaling source VF to trunk T5 to transmit a seizure signal. When slow-to-operate relay 388 operates, relay 389 releases. When an answering signal is received over trunk T5, relay 390 operates closing the circuit for operating relay 385. Relay 385 locks to ground at a front contact of relay 315 and closes a circuit for operating slow-to-operate relay 386. With relays 390 and 385 operated and before relay 386 operates, ground is connected through a back contact of relay 386, front contacts of relays 390 and 385, a back contact of relay 158 and a front contact of relay 156 of the associated outgoing trunk circuit and through a front contact of relay 315 to the winding of relay 318. After relay 390 releases at the end of the answering signal, ground is connected through a back contact of relay 390 and a front contact of relay 385 thence to the winding of relay 318. Relay 318 operates and locks to the holding ground connected to conductor 393. With relay 318 operated, the ground at the back contact of relay 390 is further connected through the lower front contact of relay 318, conductor 394, through selectors AS2 and TS2 to conductor 224, thereby releasing relay 219. The release of relay 219 extends the supervisory ground through conductor 224 and a back contact of relay 219, to the winding of relay 211. Relay 211 is operated by the current in this circuit to transmit an answering supervisory signal over the calling trunk as hereinbefore described. If a rering signal is received over the calling trunk, the momentary release of relay 190 causes the momentary release of relays 201, 310 and 387 and relay 389 is momentarily operated to connect source VF to trunk T5 to transmit a rering signal. If a rering signal is received over trunk T5, relay 390 is momentarily operated, causing the momentary release of relay 211; and relay 211 transmits the rering signal over trunk T1 as hereinbefore described. If relay 390 is operated by a disconnect signal incoming over trunk T5, relay 211 is released in like manner to send a disconnect signal over trunk T1. When a disconnect signal is received over the calling trunk T1, the release of relay 190 causes the release of relay 310 and the release of both of relays 201 and 202 thereby disconnecting holding ground from conductors 223 and 393 to cause the release switches TS2 and AS2 and return of trunk circuit TWT2 to normal as hereinbefore described. The disconnection of ground from conductor 393 causes the release of relays 315, 317 and 318, and the release of relay 307, if operated. The release of relay 310 causes the release of relays 387 and 388. After relay 387 releases and before the slow-to-release relay 388 releases, relay 389 is momentarily operated to connect source VF to trunk T5 to transmit a disconnect signal.

Assume next that the two-way trunk circuit TWT5 is selected by an auxiliary selector AS2 on a call incoming over another voice frequency intertoll trunk similar to T5, through a signaling circuit and two-way trunk circuit similar to the signaling circuit SC5 and trunk circuit TWT5. The signaling and two-way trunk circuits associated with the trunk from the calling toll office are hereinafter referred to as the calling circuits and the signaling and two-way trunk circuits associated with the trunk to the called toll office are referred to as the called circuits. The operations of the calling signaling and two-way trunk circuits are similar to those hereinbefore described on a call incoming over trunk T5 except as hereinafter mentioned; and the operations of the called trunk and signaling circuits are similar to those hereinbefore described when these circuits are seized on a call incoming over a trunk T1 except as hereinafter mentioned. Although at the time of seizure of trunk circuit TWT5, the resistor 322 of the calling trunk circuit is not short-circuited, the resistor 322 of the called trunk circuit is short-circuited by a back contact of the normally operated relay 320. Therefore, the simplex is unbalanced and not only relay 310 of the called trunk circuit operates but relay 323 in each of the connected two-way trunk circuits is operated. The operation of relay 310 of the called trunk circuit causes the operation of relays 387 and 389 to momentarily connect source VF to trunk T5 to transmit a seizure signal. When the normally operated relay 320 of the called trunk circuit releases and opens the short circuit around resistor 322, the simplex is balanced and relay 323 of each trunk circuit releases. The release of relay 323 of the called trunk circuit causes the release of relay 324 since relay 315 is operated on an outgoing call; but in the calling trunk circuit relay 324 is locked to a front contact of the then already operated relay 325. With relay 324 of the calling trunk circuit operated, the operating circuit of relay 301 is opened but relay 302 is held operated through a front contact of relay 324 and a back contact of relay 315, thence to ground in the associated signaling circuit as hereinbefore traced. Relay 324 of the calling trunk circuit also connects ground through the winding of relay 306 and uppermost front contact of relay 300 to resistors 321 and 322 to maintain closure of the simplex so as to hold relay 310 of the called trunk circuit operated. When relay 390 of the called signaling circuit is operated by an answering supervisory signal from the called toll office, it causes the operation of relay 318 of the called trunk circuit and causes the release of relay 319 and operation of relay 311 of the calling trunk circuit; but, since relay 324 is operated, the operation of relay 311 is ineffective to cause the operation of relays 387 and 389. The voice frequency answering signal, rering signals, and a disconnect signal from the called office are transmitted through the talking connection to the calling intertoll trunk. The operation of relay 390 of the called signaling circuit in response to rering or disconnect signals from the called office causes the operation of relay 311 without causing the operation of relays 387 and 389. Rering signals received from the calling office are transmitted through the talking connection to the called intertoll trunk. The operation of relay 390 of the calling signaling circuit in response to a ringing signal from the calling office, causes the momentary opening of the holding circuit for relay 302 of the calling two-way trunk circuit but relay 302 is slow-in-releasing and remains operated. A disconnect signal from the calling toll office is transmitted through the talking connection to the called toll office and also causes the operation of relay 390 of the calling signaling circuit for a long enough interval to cause the release of relay 302. The release of relay 302 of the calling trunk circuit causes the release of relay 300 of the calling trunk circuit and release of relay 310 of the called trunk circuit. All of the circuits and switches involved in the connection between the calling and called intertoll trunks are thereupon restored to normal.

What is claimed is:

1. In a telephone system, an incoming line, outgoing lines, means including a selector switch for connecting said incoming line to any one of said outgoing lines, a differential relay associated with said incoming line, a simplex circuit including the windings of said relay and the talking conductors of said selector, signal receiving means for repeating signals from the incoming line over said simplex circuit to a selected outgoing line, and signaling means associated with said outgoing line for unbalancing the simplex circuit to operate said differential relay.

2. In a telephone system, an incoming line, outgoing lines, means including a selector switch for connecting said incoming line to any one of said outgoing lines, two polarized differential relays associated with said incoming line, a simplex circuit including the windings of said relays and the talking conductors of said selector, signal receiving means for repeating signals from the incoming line over said simplex circuit to a selected outgoing line, signaling means associated with said outgoing line for decreasing the resistance of one side of said simplex circuit to cause the operation of one of said polarized differential relays, and signaling means associated with said outgoing line for reducing the resistance of the other side of said simplex circuit to cause the operation of the other of said polarized differential relays.

3. In a telephone system, an incoming line, outgoing lines, means including a selector switch for connecting said incoming line to any one of said outgoing lines, a marginal relay and a differential relay associated with said incoming line, a simplex circuit including the winding of said marginal relay and windings of said differential relay in series with the talking conductors of said selector, signal receiving means for repeating signals from the incoming line over said simplex circuit to a selected outgoing line, signaling means associated with said outgoing line for decreasing the resistance of one side of said simplex circuit to cause the operation of said differential relay, and signaling means associated with said outgoing line for decreasing the resistance of said simplex circuit to cause the operation of said marginal relay.

4. In a telephone system, an incoming line, signal receiving means associated with said line, a route selector comprising talking conductors, a sleeve conductor and a fourth conductor, groups of outgoing lines accessible to said selector, a simplex circuit including said talking conductors for repeating directive signals received by said signal receiving means to said selector, means in said selector responsive to said signals for selecting the desired group of outgoing lines and for selecting an idle line in the selected group, a resistance pad or network connected in the incoming end of said line, a pad control relay for closing and opening a short circuit around said pad, circuit means normally effective to control said pad control relay to open said short circuit, circuit means including said fourth conductor of the selector for controlling said pad control relay upon selection of a line and in accordance with the character of said line, circuit means including said fourth conductor for transmitting supervisory signals from said selected line to said incoming line, and circuit means including a differential relay in said simplex circuit for controlling said pad control relay while said fourth conductor is being used for transmitting supervisory signals.

5. In a telephone system, an incoming line, outgoing lines, means comprising talking conductors for connecting said incoming line to any one of said outgoing lines, signal receiving means associated with each of said outgoing lines, means associated with said incoming line for receiving signals incoming over said incoming line and repeating said signals to the signal receiving means associated with the connected one of said outgoing lines, the circuit for repeating said signals comprising said talking conductors connected in parallel, and a differential relay associated with said incoming line for receiving supervisory signals from the connected outgoing line, said relay having one of its windings connected in series with one of said talking conductors and another of its windings connected in series with the other of said talking conductors.

6. In a telephone system, an incoming line, outgoing lines, means comprising talking conductors for connecting said incoming line to any of said outgoing lines, signal receiving means associated with each of said outgoing lines, means associated with said incoming line for receiving signals incoming over said incoming line and repeating said signals to the signal receiving means associated with the connected one of said outgoing lines, the circuit for repeating said signals comprising said talking conductors connected in parallel, a differential relay associated with said incoming line for receiving supervisory signals from the connected outgoing line, said relay having one of its windings connected in series with one of said talking conductors and another of its windings connected in series with the other of said talking conductors, and signaling means associated with said connected outgoing line for increasing the current through one of said talking conductors to cause the operation of said relay.

7. In a telephone system, an incoming line, outgoing lines, means comprising talking conductors for connecting said incoming line to any one of said outgoing lines, signal receiving means associated with each of said outgoing lines, means associated with said incoming line for receiving signals incoming over said incoming line and repeating said signals to the signal receiving means associated with the connected one of said outgoing lines, the circuit for repeating said signals comprising said talking conductors connected in parallel, a differential relay associated with said incoming line for receiving supervisory signals from the connected outgoing line, said relay having one of its windings connected in series with one of said talking conductors and another of its windings connected in series with the other of said talking conductors, and a marginal relay associated with said incoming line, the winding of said marginal relay being connected in series with both of said talking conductors.

8. In a telephone system, an incoming line, outgoing lines, means comprising talking conductors for connecting said incoming line to any one of said outgoing lines, signal receiving means associated with each of said outgoing lines, means associated with said incoming line for receiving signals incoming over said incoming line and repeating said signals to the signal receiving means associated with the connected one of said outgoing lines, the circuit for repeating said signals comprising said talking conductors connected in parallel, a differential relay associated with said incoming line for receiving supervisory signals from the connected outgoing line, said relay having one of its windings connected in series with one of said talking conductors and another of its windings connected in series with the other of said talking conductors, a marginal relay associated wtih said incoming line, the winding of said marginal relay being connected in series with both of said talking conductors, signaling means associated with the connected outgoing line for increasing the current through one of said talking conductors to cause the operation of said differential relay, and signaling means associated with said connected outgoing line for increasing the current through both of said talking conductors to cause the operation of said marginal relay.

9. In a telephone system, an incoming line, outgoing lines, means comprising talking conductors for connecting said incoming line to any one of said outgoing lines, signal receiving means associated with each of said outgoing lines, means associated with said incoming line for receiving signals incoming over said incoming line and repeating said signals to the signal receiving means associated with the connected one of said outgoing lines, the circuit for repeating said signals comprising said talking conductors connected in parallel, a polarized differential relay associated with said incoming line for receiving supervisory signals from the connected outgoing line, said relay having one of its windings connected in series with one of said talking conductors and another of its windings connected in series with the other of said talking conductors, a second polarized differential relay associated with said incoming line for receiving supervisory signals from the connected outgoing line, said second differential relay having one of its windings connected in series with one of said talking conductors and another of its windings connected in series with the other of said talking conductors.

10. In a telephone system, an incoming line, outgoing lines, means comprising talking conductors for connecting said incoming line to any one of said outgoing lines, signal receiving means associated with each of said outgoing lines, means associated with said incoming line for receiving signals incoming over said incoming line and repeating said signals to the signal receiving means associated with the connected one of said outgoing lines, the circuit for repeating said signals comprising said talking conductors connected in parallel, a polarized differential relay associated with said incoming line for receiving supervisory signals from the connected outgoing line, said relay having one of its windings connected in series with one of said talking conductors and another of its windings connected in series with the other of said talking conductors, a second polarized differential relay associated with said incoming line for receiving supervisory signals from the connected outgoing line, said second differential relay having one of its windings connected in series with one of said talking conductors and another of its windings connected in series with the other of said talking conductors, signaling means associated with the connected outgoing line for increasing the current through one of said talking conductors to cause the operation of one of said polarized differential relays, and signaling means associated with the connected outgoing line for increasing the current through the other of said talking conductors to cause the operation of the other of said polarized differential relays.

11. In a telephone system, an incoming line, outgoing lines, means comprising talking conductors for connecting said incoming line to any one of said outgoing lines, signal receiving means associated with each of said outgoing lines, means associated with said incoming line for receiving signals incoming over said incoming line and repeating said signals to the signal receiving means associated with the connecting one of said outgoing lines, the circuit for repeating said signals comprising said talking conductors connected in parallel, a polarized differential relay associated with said incoming line for receiving supervisory signals from the connected outgoing line, said relay having one of its windings connected in series with one of said talking conductors and another of its windings connected in series with the other of said talking conductors, a second polarized differential relay associated with said incoming line for receiving supervisory signals from the connected outgoing line, said second differential relay having one of its windings connected in series with one of said talking conductors and another of its windings connected in series with the other of said talking conductors, and a marginal relay associated with said incoming line, the winding of said marginal relay being connected in series with both of said talking conductors.

12. In a telephone system, an incoming line, outgoing lines, means comprising talking conductors for connecting said incoming line to any one of said outgoing lines, signal receiving means associated with each of said outgoing lines, means associated with said incoming line for receiving signals incoming over said incoming line and repeating said signals to the signal receiving means associated with the connected one of said outgoing lines, the circuit for repeating said signals comprising said talking conductors connected in parallel, a polarized differential relay associated with said incoming line for receiving supervisory signals from the connected outgoing line, said relay having one of its windings connected in series with one of said talking conductors and another of its windings connected in series with the other of said talking conductors, a second polarized differential relay associated with said incoming line for receiving supervisory signals from the connected outgoing line, said second differential relay having one of its windings connected in series with one of said talking conductors and another of its windings connected in series with the other of said talking conductors, signaling means for increasing the current through one of said talking conductors to cause the operation of one of said polarized differential relays, signaling means for increasing the current through the other of said talking conductors to cause the operation of the other of said polarized differential relays, a marginal relay associated with said incoming line, the winding of said marginal relay being connected in series with both of said talking conductors, and signaling means for increasing the current through both of the talking conductors to operate said marginal relay.

13. In a telephone system, an incoming line, transmission pads associated with said incoming line, groups of outgoing lines, means comprising a selector switch for connecting said incoming line with an idle line in a desired one of said groups, the connection established between the incoming line and selected outgoing line comprising talking conductors, a holding conductor and a fourth conductor, a pad control relay and a normally operated relay associated with said incoming line and connected in series to said fourth conductor, circuit means associated with the selected outgoing line if in one of said groups for operating said pad control relay and holding said normally operated relay, circuit means associated with the selected line if in another of said groups for holding said normally operated relay without operating said pad control relay, subscribers' stations, means for completing the connection from said incoming line through the selected outgoing line with a called subscriber's station and for signaling the called station, circuit means associated with the selected outgoing line in either of said groups for causing the release of said normally operated relay upon answer of the call at the called station, and a supervisory relay associated with said incoming line, the release of said normally operated relay being effective to switch said fourth conductor from the windings of said normally operated and pad control relays and connect said fourth conductor to the winding of said supervisory relay.

14. In a telephone system according to claim 13, a signal relay associated with said incoming line for receiving incoming signals, a line relay associated with the selected outgoing line, and a simplex circuit closed through said talking conductors between the incoming line and the selected outgoing line for repeating signals received by said signal relay to said line relay.

15. In a telephone system according to claim 13, a signal relay associated with said incoming line for receiving incoming signals, a line relay associated with the selected outgoing line, a simplex circuit closed through said talking conductors between the incoming line and the selected outgoing line for repeating signals received by said signal relay to said line relay, a differential pad control relay having one of its windings in series with one of the conductors of the simplex circuit and the other winding in series with the other conductor of the simplex circuit, and circuit means associated with the selected outgoing line for unbalancing the simplex circuit to cause the operation of said differential pad control relay.

16. In a toll telephone system, an intertoll trunk line, an operator's position and a cord thereat, a trunk circuit terminating at said position, signal receiving means associated with said trunk line for receiving directive and supervisory signals incoming over said trunk line, means comprising a selector switch controlled by the directive signals received by said signal receiving means for connecting said trunk line to said trunk circuit, a simplex circuit comprising the talking conductors of said selector switch for transmitting supervisory signals from said signal receiving means to said trunk circuit, circuit means including a non-talking conductor of said switch for transmitting an answering supervisory signal over said trunk line upon connection of said cord to said trunk circuit to answer the call, and circuit means including a marginal relay in series with both conductors of said simplex circuit for causing the return of said selector switch to normal upon the disconnection of said cord from said trunk circuit.

17. In a toll telephone system, an intertoll trunk line, an operator's position and a cord thereat, a trunk circuit terminating at said position, signal receiving means associated with said trunk line for receiving directive and supervisory signals incoming over said trunk line, means comprising a selector switch controlled by the directive signals received by said signal receiving means for connecting said trunk line to said trunk circuit, a simplex circuit comprising the talking conductors of said selector switch for transmitting supervisory signals from said signal receiving means to said trunk circuit, circuit means including a non-talking conductor of said switch for transmitting an answering supervisory signal over said trunk line upon connection of said cord to said trunk circuit to answer the call, and circuit means including a marginal relay in series with both conductors of said simplex circuit for causing the return of said selector switch to normal upon the disconnection of said cord from said trunk circuit and for transmitting a disconnect signal over said trunk line.

18. In a telephone system, a trunk line, an operator's position and a cord thereat, said position comprising a dial, a jack at said position, a trunk circuit associating said jack with said trunk line, a signal transmitting relay in said trunk circuit, means responsive to the connection of said cord and jack for operating said signal transmitting relay to transmit a seizure signal over said trunk line, means comprising a key at said position for operatively connecting said dial to and through the talking conductors of the cord to said signal transmitting relay, circuit means including a relay in said trunk circuit rendered effective by the connection of said dial to said cord for placing said signal transmitting relay under the sole control of said dial, said signal transmitting relay being thereupon effective to repeat dial impulses over said trunk line, a cut-off relay in said trunk circuit for disconnecting the signal transmitting relay from the talking conductors of the trunk circuit and for closing a talking connection between said cord and trunk line, circuit means comprising the sleeve conductors of said cord and trunk circuit for controlling said signal transmitting relay subsequent to the operation of said cut-off relay, and circuit means comprising a relay in said trunk circuit connected to one of the talking conductors of said cord for causing the release of said cut-off relay in response to the reoperation of the dial connecting means at said position.

19. In a telephone system, a trunk line, an operator's position and a cord thereat, said position comprising a dial, a jack at said position, a trunk circuit associating said jack with said trunk line, a signal transmitting relay in said trunk circuit, means responsive to the connection of said cord and jack for operating said signal transmitting relay to transmit a seizure signal over said trunk line, means comprising a key at said position for operatively connecting said dial to and through the talking conductors of the cord to said signal transmitting relay circuit means including a relay in said trunk circuit rendered effective by the connection of said dial to said cord for placing said signal transmitting relay under the sole control of said dial, said signal transmitting relay being thereupon effective to repeat dial impulses over said trunk line, a cut-off relay in said trunk circuit for disconnecting the signal transmitting relay from the talking conductors of the trunk circuit, for closing a talking connection between said cord and trunk line, and for closing a simplex circuit including the talking conductors of said cord circuit, circuit means comprising the sleeve conductor of said cord for controlling said signal transmitting relay subsequent to the operation of said cut-off relay, transmission pads for said trunk line, a pad control relay, said pad control relay being connected in series with said simplex circuit, and circuit means comprising a relay in said trunk circuit connected in series with one of the conductors of said simplex circuit for causing the release of said cut-off relay to again place said signal transmitting relay under the control of said dial in response to the reoperation of the dial connecting means at said position.

20. In a telephone system, a line, a group selector associated with said line, means for repeating directive signals incoming over said line to said selector, said means comprising a circuit including the talking conductors in parallel, means in said selector for selecting the group corresponding to said signals and for seizing a set of terminals therein, a trunk circuit, means connecting said seized set of terminals to said trunk circuit, means including the talking conductors of said group selector in parallel for repeating signals incoming over said line to said trunk circuit, a resistance network in series with a talking conductor of said line, means including a relay for short circuiting said network, and control means for said relay, said control means including the talking conductors of said group selector in parallel and talking conductors of said trunk circuit in parallel.

21. In a telephone system according to claim 20, means including said talking conductors of said group selector in parallel and said talking conductors of said trunk circuit in parallel for effecting the return of said selector to normal.

22. In a telephone system, an exchange, a trunk extending to said exchange, means for routing a connection from said trunk to a called line terminating at said exchange, said connection comprising one or more conductors defining a control path, means controlled over said path for controlling the voice current transmission level over said trunk, and means also controlled over said path for transmitting a supervisory signal over said trunk.

23. In a telephone system, an exchange, a trunk extending to said exchange, means including automatic switching apparatus for routing a connection from said trunk to a called line terminating at said exchange, said connection comprising a pair of conductors defining a communication channel and a third conductor defining a control path, means controlled over said path for controlling the voice current transmission level over said trunk, and means also controlled over said path for transmitting a supervisory signal over said trunk.

24. In a telephone system, an exchange, a trunk extending to said exchange, an operator's position including position equipment and a supervisory signal, means including said operator's position equipment for routing a connection from said trunk to a called line terminating at said exchange, said connection comprising one or more conductors defining a control path, means controlled over said path for controlling the voice current transmission level over said trunk, and means also controlled over said path for controlling said supervisory signal.

25. In a telephone system, an exchange, a trunk extending to said exchange, means for routing a connection from said trunk to a called line terminating at said exchange, said connection comprising one or more conductors defining a control path, the resistance of said control path being varied between two values in response to supervisory operations performed at the distant end of said called line, means operative in response to the completion of said path when the called line is seized for changing the voice current transmission level over said trunk, said last-named means being locked operated following its operation, and means also operative in response to the completion of said path for transmitting a supervision signal over said trunk and thereafter operative in response to variations in the resistance of said path between said values to transmit additional supervisory signals over said trunk.

26. In a telephone system, an exchange, a trunk extending to said exchange, means for routing a connection from said trunk to a called line terminating at said exchange, said connection comprising one or more conductors defining a control path, the resistance of said control path being varied between two values in response to supervisory operations performed at the distant end of said called line, means controlled over said path for determining the voice current transmission level over said trunk, and means controlled over said path in accordance with variations in the resistance of said path between said values for transmitting supervisory signals over said trunk.

27. In a telephone system, an exchange, a trunk extending to said exchange, means for routing connections from said trunk to called lines terminating at said exchange, each of said connections comprising one or more conductors defining a control path extending to the exchange terminus of the called line, the terminating impedances of said control paths being different for different lines, means controlled over said paths in accordance with the terminating impedances thereof for determining the voice current transmission level over said trunk, and means also controlled over said paths for transmitting supervisory signals over said trunk.

28. In a telephone system, an exchange, a trunk extending to said exchange, means for routing connections from said trunk to called lines terminating at said exchange, each of said connections comprising one or more conductors defining a control path extending to the exchange terminus of the called line, the terminating impedances of said control paths being different for different lines, means controlled over said paths in accordance with the terminating impedances thereof for determining the voice current transmission level over said trunk, the resistance of at least one of said paths being variable between two values in response to supervisory operations performed at the distant end of the called line, and means operative in response to variations in the resistance of said one path between said values for transmitting supervisory signals over said trunk.

29. In a telephone system, an exchange, a trunk extending to said exchange, means for routing a connection from said trunk to a called line terminating at said exchange, said connection comprising a pair of conductors defining a communication channel and a third conductor defining a control path and a section of said communication channel, and means controlled over said path for controlling the voice current transmission level over said trunk.

30. In a telephone system, an exchange, a trunk extending to said exchange, means for routing connections from said trunk to called lines terminating at said exchange, each of said connections comprising a pair of conductors defining a communication channel and a third conductor defining a control path which extends to the exchange terminus of the called line, the terminating impedances of said paths being different for different lines, and means controlled over said paths in accordance with the terminating impedances of said paths for controlling the voice current transmission level over said trunk.

31. In a telephone system, an exchange, a trunk extending to said exchange, a trunk circuit in said exchange, automatic switching apparatus including said trunk circuit for routing connections from said trunk to called lines terminating at said exchange, each of said connections including a control path extending from said trunk circuit to the terminus of the called line, the terminating impedance of said paths being different for different lines, a relay comprising a winding included in the common portion of said paths and selectively controlled in accordance with the terminating impedances of said paths, and means controlled in accordance with the setting of said relay for controlling the voice current transmission level over said trunk.

32. In a telephone system, an exchange, a line extending to said exchange, a line circuit terminating said line in said exchange, a switching unit, means including automatic switching apparatus for routing a connection from said line through said switching unit to a called line terminating at said exchange, said connection comprising a resistance bridge including in its arms the talking conductors of the portion of the connection extending between said line circuit and said switching unit, and means controlled in accordance with the balanced or unbalanced condition of said bridge for determining the voice current transmission level over said first-named line.

33. In a telephone system, an exchange, a line extending to said exchange, a line circuit terminating said line in said exchange, a switching unit, means including automatic switching apparatus for routing a connection from said line through said switching unit to a called line terminating at said exchange, said connection comprising a resistance bridge including in its arms the talking conductors of the portion of the connection extending between said line circuit and said switching unit, the arms of said bridge which include said talking conductors being progressively extended at each switching stage of said portion of the connection, means controlled in accordance with the balanced or unbalanced condition of said bridge for determining the voice current transmission level over said first-named line.

34. In a telephone system, an exchange, a line extending to said exchange, a line circuit terminating said line in said exchange, a trunk circuit, means including automatic switching apparatus for routing a connection from said line through said trunk circuit to a called line terminating at said exchange, said connection comprising a resistance bridge including in its arms the talking conductors of the portion of the connection extending between said line and trunk circuits, means controlled in accordance with the directory number designation of said called line for determining the balanced or unbalanced condition of said bridge, and means controlled in accordance with the balanced or unbalanced condition of said bridge for controlling the voice current transmission level over said first-named line.

35. In a telephone system, an exchange, a line extending to said exchange, a line circuit terminating said line in said exchange, a trunk circuit, means including automatic switching apparatus for routing a connection from said line through said trunk circuit to a called line terminating at said exchange, said connection comprising a resistance bridge including in its arms the talking conductors of the portion of the connection extending between said line and trunk circuits, the arms of said bridge which include said talking conductors being progressively extended at each switching stage of said portion of the connection, means controlled in accordance with the directory number designation of said called line for determining the balanced or unbalanced condition of said bridge, and means controlled in accordance with the balanced or unbalanced condition of said bridge for controlling the voice current transmission level over said first-named line.

36. In a telephone system, an exchange, a line extending to said exchange, a line circuit terminating said line in said exchange, a trunk circuit, means including automatic switching apparatus for routing a connection from said line through said trunk circuit to a called line terminating at said exchange, said connection comprising a resistance bridge including in its arms the talking conductors of the portion of the connection extending between said line and trunk circuits, the arms of said bridge which include said talking conductors being progressively extended at each switching stage of said portion of the connection and being so proportioned that said bridge is balanced, means operative in the event said connection is extended to a called line of a particular character for unbalancing said bridge, and means operative to change the voice current transmission level over said first-named line in response to the unbalancing of said bridge.

37. In a telephone system, an exchange, a line extending to said exchange, a line circuit terminating said line in said exchange, a trunk circuit, means including automatic switching apparatus for routing a connection from said line through said trunk circuit to a called line terminating at said exchange, said connection comprising a resistance bridge including in its arms the talking conductors of the portion of the connection extending between said line and trunk circuits and a control path extending between said trunk circuit and the terminus of the called line, the terminating impedance of said control path being different depending upon the character of the called line, means controlled in accordance with the terminating impedance of said control path for determining the balanced or unbalanced condition of said bridge, and means controlled in accordance with the balanced or unbalanced condition of said bridge for controlling the voice current transmission level over said first-named line.

38. In a telephone system, an exchange, a line extending to said exchange, a line circuit terminating said line in said exchange, a trunk circuit, means including automatic switching apparatus for routing a connection from said trunk through said trunk circuit to a called line terminating at said exchange, said connection comprising a resistance bridge including in its arms the talking conductors of the portion of the connection extending between said line and trunk circuits and a control path extending between said trunk circuit and the terminus of the called line, the arms of said bridge which include said talking conductors being progressively extended at each switching stage of said portion of said connection and the terminating impedance of said control path being different depending upon the character of the called line, means controlled in accordance with the terminating impedance of said control path for determining the balanced or unbalanced condition of said bridge, and means controlled in accordance with the balanced or unbalanced condition of said bridge for controlling the voice current transmission level over said first-named line.

39. In a telephone system, an exchange, a line extending to said exchange, means including automatic switching apparatus for extending a connection from said line to a called line terminating at said exchange, said connection comprising two conductors defining a communication channel and a third conductor defining a control path extending to the terminus of said called line, and means controlled over said control path and a section of said communication channel for controlling the voice current transmission level over said first-named line.

40. In a telephone system, an incoming line, outgoing lines, means including a selector switch for connecting said incoming line to any one of said outgoing lines, a simplex circuit including the talking conductors of said selector, a relay associated with said incoming line and operative in response to the unbalancing of said simplex circuit, signal receiving means for repeating signals from the incoming line over said simplex circuit, and signaling means associated with said outgoing line for unbalancing said simplex circuit to cause the operation of said relay.

41. In a telephone system, an incoming line, signal receiving means associated with said line, a selector comprising talking conductors, a control conductor and a fourth conductor, groups of outgoing lines accessible to said selector, a simplex circuit including said talking conductors for repeating directive signals received by said signal receiving means to said selector, means in said selector responsive to said signals for selecting the desired group of outgoing lines and for selecting an idle line in the selected group, a network connected in the incoming end of said incoming line, circuit means including a relay operative in response to an unbalanced condition of said simplex circuit for controlling said network to determine the signal current transmission level over said incoming line, and circuit means including said fourth conductor for transmitting supervisory signals from said selected line to said incoming line.

42. In a telephone system, an incoming line, a network connected in the incoming end of said line, an outgoing line, a selector including a pair of talking conductors and a non-talking conductor, means including said selector for establishing a connection between said lines, means including a circuit comprising said talking conductors in parallel for controlling said network, means including a circuit comprising said talking conductors in parallel for repeating supervisory signals transmitted over said incoming line to said outgoing line, and means including a circuit comprising said non-talking conductor for repeating supervisory signals transmitted over said outgoing line to said incoming line.

RALPH E. KING.
OHMER R. MILLER.